(12) United States Patent
Watanabe et al.

(10) Patent No.: US 11,879,865 B2
(45) Date of Patent: Jan. 23, 2024

(54) SENSOR ELEMENT

(71) Applicant: NGK INSULATORS, LTD., Nagoya (JP)

(72) Inventors: Yusuke Watanabe, Nagoya (JP); Mika Kai, Nagoya (JP); Ryo Onishi, Iwakura (JP); Saki Suzuki, Nagoya (JP); Takashi Hino, Kasugai (JP)

(73) Assignee: NGK INSULATORS, LTD., Nagoya (JP)

( * ) Notice: Subject to any disclaimer, the term of this patent is extended or adjusted under 35 U.S.C. 154(b) by 481 days.

(21) Appl. No.: 17/207,986

(22) Filed: Mar. 22, 2021

(65) Prior Publication Data

US 2021/0208096 A1  Jul. 8, 2021

Related U.S. Application Data

(63) Continuation of application No. PCT/JP2019/037894, filed on Sep. 26, 2019.

(30) Foreign Application Priority Data

Oct. 3, 2018 (JP) .................................. 2018-187834

(51) Int. Cl.
*G01N 27/407* (2006.01)
*C04B 38/00* (2006.01)
(Continued)

(52) U.S. Cl.
CPC ......... *G01N 27/4077* (2013.01); *C04B 38/00* (2013.01); *G01N 27/4071* (2013.01);
(Continued)

(58) Field of Classification Search
CPC ........... G01N 27/4077; G01N 27/4071; G01N 27/4078; G01N 27/41; G01N 27/419
See application file for complete search history.

(56) References Cited

U.S. PATENT DOCUMENTS 9,476,863 B2   10/2016 Sakuma et al.
10,845,298 B2 * 11/2020 Onishi ................... G01N 19/04
(Continued)

FOREIGN PATENT DOCUMENTS

CN        102680552 A      9/2012
DE    102009055302 A1 *   7/2010  ......... G01N 27/4077
(Continued)

OTHER PUBLICATIONS

Chinese Office Action received in corresponding Chinese Application No. 201980055310.4 dated Oct. 26, 2022.
(Continued)

*Primary Examiner* — Ryan D Walsh
(74) *Attorney, Agent, or Firm* — MATTINGLY & MALUR, PC

(57) ABSTRACT

A sensor element includes: an inner protective layer having a porosity of 30% to 65% on two main surfaces; an intermediate protective layer, at least a part of which has contact with the inner layer, and having a porosity of 25% to 80%, which is equal to or smaller than the porosity of the inner layer; and an outer protective layer surrounding an element base on an outermost periphery on the one end portion of the sensor element, having contact with the intermediate and the inner layer, having contact with a leading end surface of the element base or the intermediate layer on the leading end surface, and having a porosity of 15% to 30%, which is smaller than the porosity of the intermediate layer, wherein a difference of porosity between the inner and the outer layer is 10% to 50%.

20 Claims, 8 Drawing Sheets

(51) Int. Cl.
*G01N 27/41* (2006.01)
*G01N 27/419* (2006.01)

(52) U.S. Cl.
CPC ......... *G01N 27/4078* (2013.01); *G01N 27/41* (2013.01); *G01N 27/419* (2013.01)

(56) References Cited

U.S. PATENT DOCUMENTS

| | | | |
|---|---|---|---|
| 11,249,044 B2* | 2/2022 | Watanabe | G01N 27/41 |
| 11,327,043 B2* | 5/2022 | Hino | G01N 27/4071 |
| 11,360,043 B2* | 6/2022 | Watanabe | G01N 27/41 |
| 11,385,197 B2* | 7/2022 | Watanabe | G01N 27/4077 |
| 11,385,199 B2* | 7/2022 | Watanabe | G01N 27/409 |
| 11,415,544 B2* | 8/2022 | Watanabe | G01N 27/4077 |
| 11,486,852 B2* | 11/2022 | Onishi | G01N 27/4071 |
| 11,567,033 B2* | 1/2023 | Watanabe | G01N 27/4067 |
| 11,579,112 B2* | 2/2023 | Hino | G01N 27/4074 |
| 11,592,419 B2* | 2/2023 | Hino | G01N 27/4071 |
| 2012/0211362 A1 | 8/2012 | Onkawa et al. | |
| 2013/0104625 A1 | 5/2013 | Otsuka et al. | |
| 2016/0054256 A1 | 2/2016 | Sakuma et al. | |
| 2016/0161445 A1 | 6/2016 | Sakakibara et al. | |
| 2018/0284055 A1 | 10/2018 | Hino | |
| 2021/0208097 A1* | 7/2021 | Watanabe | C04B 38/00 |
| 2021/0356423 A1* | 11/2021 | Mori | G01N 27/409 |
| 2021/0389268 A1* | 12/2021 | Onishi | G01N 27/4072 |
| 2021/0389269 A1* | 12/2021 | Onishi | G01N 27/4071 |
| 2021/0389270 A1* | 12/2021 | Onishi | G01N 27/4071 |
| 2021/0389271 A1* | 12/2021 | Onishi | G01N 27/4071 |

FOREIGN PATENT DOCUMENTS

| | | |
|---|---|---|
| JP | 2012-189579 A | 10/2012 |
| JP | 2013-096792 A | 5/2013 |
| JP | 2016-048230 A | 4/2016 |
| JP | 2016-109685 A | 6/2016 |
| JP | 6014000 B2 | 10/2016 |
| JP | 2018-169324 A | 11/2018 |

OTHER PUBLICATIONS

Unexamined U.S. Appl. No. 17/207,996, filed Mar. 22, 2021.
International Search Report of PCT/JP2019/037894 dated Nov. 19, 2019.
International Search Report of PCT/JP2019/037941 dated Nov. 19, 2019.

* cited by examiner

SENSOR ELEMENT

CROSS-REFERENCE TO RELATED APPLICATION

This application is a continuation application of PCT/JP2019/037894, filed on Sep. 26, 2019, which claims the benefit of priority of Japanese Patent Application No. 2018-187834, filed on Oct. 3, 2018, the entire contents of which are incorporated herein by reference.

BACKGROUND OF THE INVENTION

Field of the Invention

The present invention relates to a gas sensor detecting a predetermined gas component in a measurement gas, and, in particular, to a configuration for preventing water-induced cracking of a sensor element included in the gas sensor.

Description of the Background Art

As a gas sensor for determining concentration of a desired gas component in a measurement gas, a gas sensor that includes a sensor element made of an oxygen-ion conductive solid electrolyte, such as zirconia ($ZrO_2$), and including some electrodes on the surface and the inside thereof has been widely known. Such a sensor element includes a protective layer formed of a porous body (porous protective layer) to prevent cracking of the sensor element (more particularly, an element base) occurring due to thermal shock caused by adherence of water droplets, which is so-called water-induced cracking. The extent of the effect of preventing the water-induced cracking is also referred to as water resistance property.

As such a sensor element, a sensor element including protective layers provided on opposite main surfaces of an elongated planar element base, and further including a porous protective layer provided to a leading end portion has already been known (see Japanese Patent Application Laid-Open No. 2016-48230, for example).

A gas sensor element including an elongated plate-like element having a detection part on a leading end side, a porous first protective layer covering the whole detection part, and a porous second protective layer covering an outer periphery of the first protective layer and at least a range from the leading end side of the first protective layer to a back end side than a porous layer covering an electrode located on an outer side of the element also has already been known (see Japanese Patent No. 6014000, for example).

Japanese Patent Application Laid-Open No. 2016-48230 discloses that forming the porous protective layer in a region, of the leading end portion of the sensor element, in a temperature state of 500° C. or more when the gas sensor is in use while not forming the porous protective layer in a region in a temperature state of 300° C. or less when the gas sensor is in use can reduce power consumption and a waiting time until detection due to reduction in area of formation of the porous protective layer, and can achieve suppression of cracking due to improvement in water resistance property.

The sensor element according to Japanese Patent Application Laid-Open No. 2016-48230, however, does not necessarily have sufficient water resistance property, and is subject to water-induced cracking in a case where the amount of water exposure is large.

In the gas sensor element disclosed in Japanese Patent No. 6014000 in which the second protective layer on the outer side covers the whole first protective layer on the inner side, a porosity of the second protective layer is small, thus there is a possibility that the second protective layer is peeled off on the back end side due to insufficient adhesion to an element body or water-induced cracking occurs in use at a high temperature.

SUMMARY

The present invention relates to a gas sensor detecting a predetermined gas component in a measurement gas, and, in particular, to a configuration for preventing water-induced cracking of a sensor element included in the gas sensor.

According to the present invention, a sensor element included in a gas sensor detecting a predetermined gas component in a measurement gas, includes: an element base including: an elongated planar ceramic body made of an oxygen-ion conductive solid electrolyte, and having a gas inlet at the one end portion thereof; at least one internal chamber located inside the ceramic body, and communicating with the gas inlet under predetermined diffusion resistance; at least one electrochemical pump cell including an outer pump electrode located at a location other than the at least one internal chamber in the ceramic body, an inner pump electrode located to face the at least one internal chamber, and a solid electrolyte located between the outer pump electrode and the inner pump electrode, the at least one electrochemical pump cell pumping in and out oxygen between the at least one internal chamber and an outside; a heater buried in a predetermined range on a side of the one end portion of the ceramic body; and an inner leading-end protective layer made up of a porous material having a porosity of 30% or more and 65% or less on at least two main surfaces facing each other on the one end portion; an intermediate leading-end protective layer, at least a part of which has contact with the inner leading-end protective layer, made up of a porous material having a porosity of 25% or more and 80% or less, which is equal to or smaller than the porosity of the inner leading-end protective layer; and an outer leading-end protective layer surrounding the element base on an outermost periphery on the one end portion of the sensor element, having contact with the intermediate leading-end protective layer and the inner leading-end protective layer on sides of four side surfaces of the element base, having contact with a leading end surface of the element base or the intermediate leading-end protective layer on a side of the leading end surface, and made up of a porous material having a porosity of 15% or more and 30% or less, which is smaller than the porosity of the intermediate leading-end protective layer, wherein a difference of porosity between the inner leading-end protective layer and the outer leading-end protective layer is equal to or larger than 10% and equal to or smaller than 50%.

According to the present invention, a sensor element having greater water resistance property than that of a conventional sensor element and suppressing delamination of a protective layer is achieved.

It is therefore an object of the present invention to provide a sensor element including a porous protective layer on one end portion at which an inlet for a measurement gas is provided, and having greater water resistance property than that of a conventional sensor element.

DESCRIPTION OF THE PREFERRED EMBODIMENTS

First Embodiment

<Overview of Sensor Element and Gas Sensor>

Figure 1:
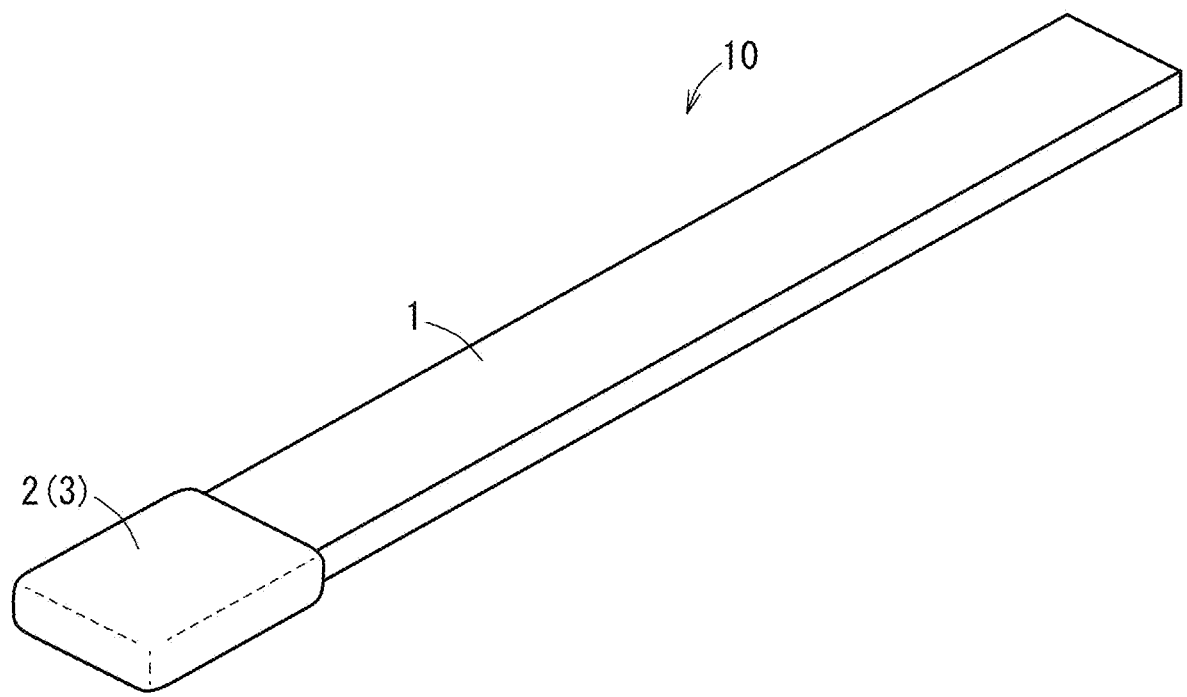
FIG. 1 is a schematic external perspective view of a sensor element 10 according to a first embodiment.
Figure 2:
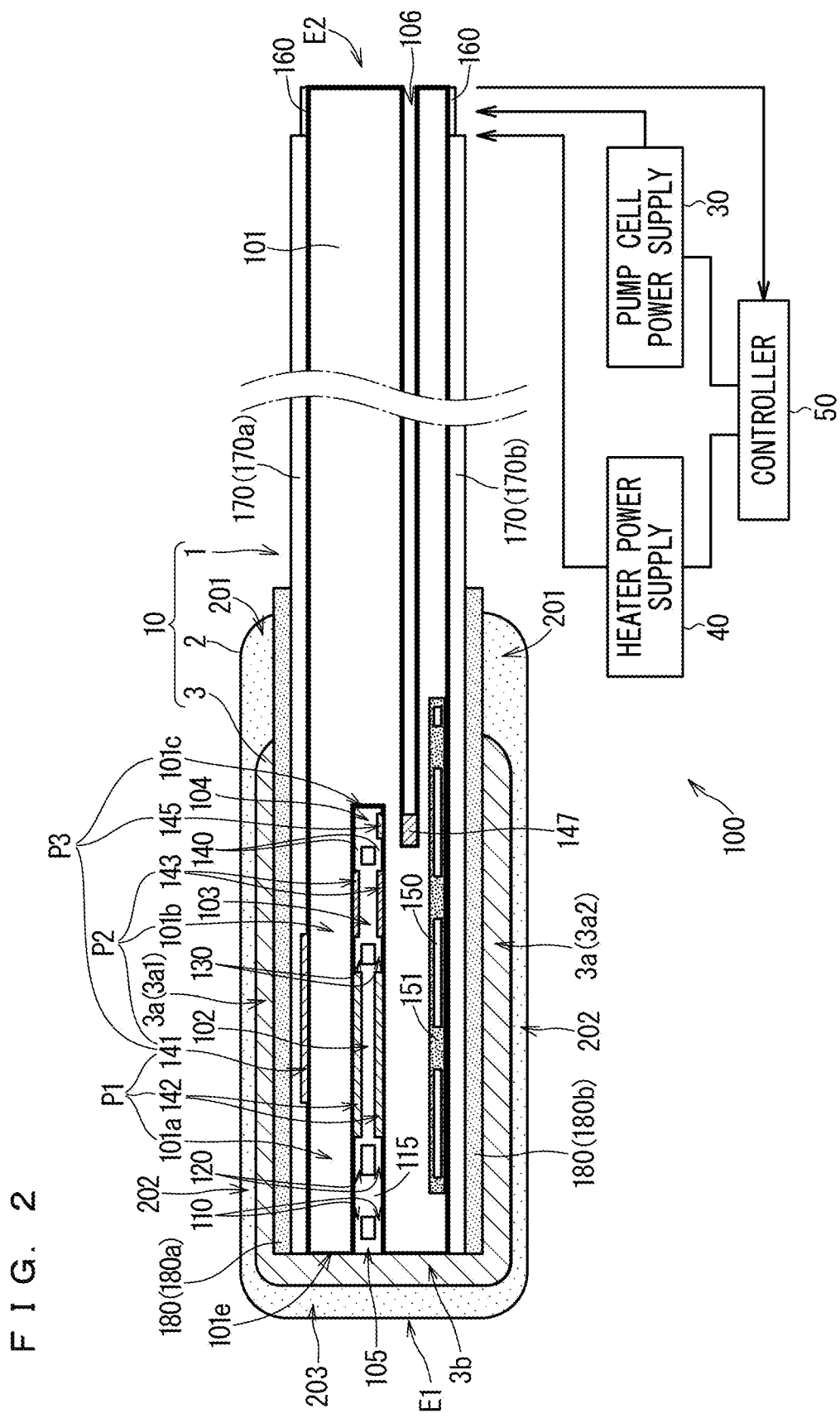
FIG. 2 is a schematic diagram illustrating a configuration of a gas sensor 100 including a sectional view taken along a longitudinal direction of the sensor element 10.

FIG. 1 is a schematic external perspective view of a sensor element (gas sensor element) 10 according to a first embodiment of the present invention. FIG. 2 is a schematic diagram illustrating a configuration of a gas sensor 100 including a sectional view taken along a longitudinal direction of the sensor element 10. The sensor element 10 is a main component of the gas sensor 100 detecting a predetermined gas component in a measurement gas, and measuring concentration thereof. The sensor element 10 is a so-called limiting current gas sensor element.

The gas sensor 100 mainly includes a pump cell power supply 30, a heater power supply 40, and a controller 50 in addition to the sensor element 10.

As illustrated in FIG. 1, the sensor element 10 schematically has a configuration that a side of one end portion of an elongated planar element base 1 is covered by a porous outer leading-end protective layer (first leading-end protective layer) 2 and an intermediate leading-end protective layer (second leading-end protective layer) 3 also having the porous structure inside the outer-leading-end protective layer 2.

As illustrated in FIG. 2, the element base 1 is a structural body mainly including an elongated planar ceramic body 101, includes a main surface protective layer 170 on two main surfaces facing each other of the ceramic body 101, and further includes an inner leading-end protective layer (third leading-end protective layer) 180 on at least the two main surfaces (on the main surface protective layer 170) on one end portion. In addition, in the sensor element 10, the outer leading-end protective layer 2 and the intermediate leading-end protective layer 3 described above are provided on four side surfaces and an outer side of a leading-end surface (outside the inner leading-end protective layers 180 in a portion where the inner leading-end protective layers 180 are present) on the side of one end portion of the element base 1. These outer leading-end protective layer 2 and the intermediate leading-end protective layer 3 and the inner leading-end protective layers 180 have in common that they protect the leading end portion of the element base 1 from adherence of a poisoned substance and water exposure, but are different in a forming method, a formation timing, and furthermore, a forming purpose and a function.

The four side surfaces of the sensor element 10 (or the element base 1, or the ceramic body 101) other than opposite end surfaces in the longitudinal direction thereof are hereinafter simply referred to as side surfaces of the sensor element 10 (or the element base 1, or the ceramic body 101). A leading end surface 101e of the ceramic body 101 is also referred to as a leading end surface 101e of the element base 1.

The ceramic body 101 is made of ceramic containing, as a main component, zirconia (yttrium stabilized zirconia), which is an oxygen-ion conductive solid electrolyte. Various components of the sensor element 10 are provided outside and inside the ceramic body 101. The ceramic body 101 having the configuration is dense and airtight. The configuration of the sensor element 10 illustrated in FIG. 2 is just an example, and a specific configuration of the sensor element 10 is not limited to this configuration.

The sensor element 10 illustrated in FIG. 2 is a so-called serial three-chamber structure type gas sensor element including a first internal chamber 102, a second internal chamber 103, and a third internal chamber 104 inside the ceramic body 101. That is to say, in the sensor element 10, the first internal chamber 102 communicates, through a first diffusion control part 110 and a second diffusion control part 120, with a gas inlet 105 opening to the outside on a side of one end portion E1 of the ceramic body 101 (to be precise, communicating with the outside through the outer leading-end protective layer 2 and the intermediate leading-end protective layer 3), the second internal chamber 103 communicates with the first internal chamber 102 through a third diffusion control part 130, and the third internal chamber 104 communicates with the second internal chamber 103 through a fourth diffusion control part 140. A path from the gas inlet 105 to the third internal chamber 104 is also referred to as a gas distribution part. In the sensor element 10 according to the present embodiment, the distribution part is provided straight along the longitudinal direction of the ceramic body 101.

The first diffusion control part 110, the second diffusion control part 120, the third diffusion control part 130, and the fourth diffusion control part 140 are each provided as two slits vertically arranged in FIG. 2. The first diffusion control part 110, the second diffusion control part 120, the third diffusion control part 130, and the fourth diffusion control part 140 provide predetermined diffusion resistance to a measurement gas passing therethrough. A buffer space 115 having an effect of buffering pulsation of the measurement gas is provided between the first diffusion control part 110 and the second diffusion control part 120.

An external pump electrode 141 is provided on an outer surface of the ceramic body 101, and an internal pump electrode 142 is provided in the first internal chamber 102. Furthermore, an auxiliary pump electrode 143 is provided in the second internal chamber 103, and a measurement electrode 145 is provided in the third internal chamber 104. In addition, a reference gas inlet 106 which communicates with the outside and through which a reference gas is introduced is provided on a side of the other end portion E2 of the ceramic body 101, and a reference electrode 147 is provided in the reference gas inlet 106.

In a case where a target of measurement of the sensor element 10 is NOx in the measurement gas, for example, concentration of a NOx gas in the measurement gas is calculated by a process as described below.

First, the measurement gas introduced into the first internal chamber 102 is adjusted to have an approximately constant oxygen concentration by a pumping action (pumping in or out of oxygen) of a main pump cell P1, and then introduced into the second internal chamber 103. The main pump cell P1 is an electrochemical pump cell including the external pump electrode 141, the internal pump electrode 142, and a ceramic layer 101a that is a portion of the ceramic body 101 existing between these electrodes. In the second internal chamber 103, oxygen in the measurement gas is pumped out of the element by a pumping action of an auxiliary pump cell P2 that is also an electrochemical pump cell, so that the measurement gas is in a sufficiently low oxygen partial pressure state. The auxiliary pump cell P2 includes the external pump electrode 141, the auxiliary pump electrode 143, and a ceramic layer 101b that is a portion of the ceramic body 101 existing between these electrodes.

The external pump electrode 141, the internal pump electrode 142, and the auxiliary pump electrode 143 are each formed as a porous cermet electrode (e.g., a cermet electrode made of $ZrO_2$ and Pt that contains Au of 1%). The internal pump electrode 142 and the auxiliary pump electrode 143 to be in contact with the measurement gas are each formed using a material having weakened or no reducing ability with respect to a NOx component in the measurement gas.

NOx in the measurement gas caused by the auxiliary pump cell P2 to be in the low oxygen partial pressure state is introduced into the third internal chamber 104, and reduced or decomposed by the measurement electrode 145 provided in the third internal chamber 104. The measurement electrode 145 is a porous cermet electrode also functioning as a NOx reduction catalyst that reduces NOx existing in the atmosphere in the third internal chamber 104. During the reduction or decomposition, a potential difference between the measurement electrode 145 and the reference electrode 147 is maintained constant. Oxygen ions generated by the above-mentioned reduction or composition are pumped out of the element by a measurement pump cell P3. The measurement pump cell P3 includes the external pump electrode 141, the measurement electrode 145, and a ceramic layer 101c that is a portion of the ceramic body 101 existing between these electrodes. The measurement pump cell P3 is an electrochemical pump cell pumping out oxygen generated by decomposition of NOx in the atmosphere around the measurement electrode 145. It is also applicable that the external pump electrode 141 is not provided on the outer surface of the ceramic body 101 but is provided an appropriate position other than the internal chamber as long as pumping in the main pump cell P1, the auxiliary pump cell P2, and the measurement pump cell P3 is preferably performed.

Pumping (pumping in or out of oxygen) of the main pump cell P1, the auxiliary pump cell P2, and the measurement pump cell P3 is achieved, under control performed by the controller 50, by the pump cell power supply (variable power supply) 30 applying voltage necessary for pumping between electrodes included in each of the pump cells. In a case of the measurement pump cell P3, voltage is applied across the external pump electrode 141 and the measurement electrode 145 so that the potential difference between the measurement electrode 145 and the reference electrode 147 is maintained at a predetermined value. The pump cell power supply 30 is typically provided for each pump cell.

The controller 50 detects a pump current Ip2 flowing between the measurement electrode 145 and the external pump electrode 141 in accordance with the amount of oxygen pumped out by the measurement pump cell P3, and calculates a NOx concentration in the measurement gas based on a linear relationship between a current value (NOx signal) of the pump current Ip2 and the concentration of decomposed NOx.

The gas sensor 100 preferably includes a plurality of electrochemical sensor cells, which are not illustrated, detecting the potential difference between each pump electrode and the reference electrode 147, and each pump cell is controlled by the controller 50 based on a signal detected by each sensor cell.

In the sensor element 10, a heater 150 is buried in the ceramic body 101. The heater 150 is provided, below the gas distribution part in FIG. 2, over a range from the vicinity of the one end portion E1 to at least a location of formation of the measurement electrode 145 and the reference electrode 147. The heater 150 is provided mainly to heat the sensor element 10 to enhance oxygen-ion conductivity of the solid electrolyte forming the ceramic body 101 when the sensor element 10 is in use. More particularly, the heater 150 is provided to be surrounded by an insulating layer 151.

The heater 150 is a resistance heating body made, for example, of platinum. The heater 150 generates heat by being powered from the heater power supply 40 under control performed by the controller 50.

The sensor element 10 according to the present embodiment is heated by the heater 150 when being in use so that the temperature at least in a range from the first internal chamber 102 to the second internal chamber 103 becomes 500° C. or more. In some cases, the sensor element 10 is heated so that the temperature of the gas distribution part as a whole from the gas inlet 105 to the third internal chamber 104 becomes 500° C. or more. These are to enhance the oxygen-ion conductivity of the solid electrolyte forming each pump cell and to desirably demonstrate the ability of each pump cell. In this case, the temperature in the vicinity of the first internal chamber 102, which becomes the highest temperature, becomes approximately 700° C. to 800° C.

In the following description, from among the two main surfaces of the ceramic body 101, a main surface (or an outer surface of the sensor element 10 having the main surface) which is located on an upper side in FIG. 2 and on a side where the main pump cell P1, the auxiliary pump cell P2, and the measurement pump cell P3 are mainly provided is also referred to as a pump surface, and a main surface (or an outer surface of the sensor element 10 having the main surface) which is located on a lower side in FIG. 2 and on a side where the heater 150 is provided is also referred to as a heater surface. In other words, the pump surface is a main surface closer to the gas inlet 105, the three internal chambers, and the pump cells than to the heater 150, and the heater surface is a main surface closer to the heater 150 than to the gas inlet 105, the three internal chambers, and the pump cells.

A plurality of electrode terminals 160 are provided on the respective main surfaces of the ceramic body 101 on the other end portion E2 to establish electrical connection between the sensor element 10 and the outside. These electrode terminals 160 are electrically connected to the above-mentioned five electrodes, opposite ends of the heater 150, and a lead for detecting heater resistance, which is not illustrated, through leads provided inside the ceramic body 101, which are not illustrated, to have a predetermined correspondence relationship. Application of a voltage from the pump cell power supply 30 to each pump cell of the sensor element 10 and heating by the heater 150 by being powered from the heater power supply 40 are thus performed through the electrode terminals 160.

The sensor element 10 further includes the above-mentioned main surface protective layers 170 (170a, 170b) on the pump surface and the heater surface of the ceramic body 101. The main surface protective layers 170 are layers made of alumina, having a thickness of approximately 5 µm to 30 µm, and including pores with a porosity of approximately 20% to 40%, and are provided to prevent adherence of any foreign matter and poisoned substances to the main surfaces (the pump surface and the heater surface) of the ceramic body 101 and the external pump electrode 141 provided on the pump surface. The main surface protective layer 170a on the pump surface thus functions as a pump electrode protective layer for protecting the external pump electrode 141.

In the present embodiment, the porosity is obtained by applying a known image processing method (e.g., binarization processing) to a scanning electron microscope (SEM) image of an evaluation target.

The main surface protective layers 170 are provided over substantially all of the pump surface and the heater surface except that the electrode terminals 160 are partially exposed in FIG. 2, but this is just an example. The main surface protective layers 170 may locally be provided in the vicinity of the external pump electrode 141 on the one end portion E1 compared with the case illustrated in FIG. 2.

On the side of the one end portion E1 of the element base 1 included in the sensor element 10, the above-mentioned inner leading-end protective layers 180 are provided on at least two main surfaces (the pump surface and the heater surface). The inner leading-end protective layers 180 are porous layers made of alumina, having a relatively large porosity of 30% to 65%, and having a thickness of 20 µm to 50 µm. The main surface protective layers 170, however, are provided on the surface of the ceramic body 101 at least in a range in which the inner leading-end protective layers 180 are formed in the pump surface and the heater surface.

The inner leading-end protective layers 180 have a role of preventing poisoning and exposure to water of the sensor element 10 along with the outer leading-end protective layer 2, the intermediate leading-end protective layer 3, and further the main surface protective layers 170. For example, the inner leading-end protective layers 180 have higher heat insulating properties than those of the outer leading-end protective layer 2 and the main surface protective layers 170 as they have a large porosity second only to the intermediate leading-end protective layer 3, and this contributes to improvement in water resistance property of the sensor element 10.

The inner leading-end protective layers 180 also have a role as underlying layers when the outer leading-end protective layer 2 and the intermediate leading-end protective layer 3 are formed with respect to the element base 1. In that sense, it is only required that the inner leading-end protective layers 180 are formed, on the opposing main surfaces of the element base 1, at least in a range surrounded by the outer leading-end protective layer 2 and the intermediate leading-end protective layer 3.

<Outer Leading-End Protective Layer and Intermediate Leading-End Protective Layer>

In the sensor element 10, the outer leading-end protective layer 2 that is a porous layer made of alumina having a purity of 99.0% or more is provided around an outermost periphery in a predetermined range from the one end portion E1 of the element base 1 having a configuration as described above, and the intermediate leading-end protective layer 3 that is a porous layer made of the same type of alumina is provided between the outer leading-end protective layer 2 and the inner leading-end protective layers 180.

The intermediate leading-end protective layer 3 is provided along the four side surfaces and the end surface on the one end portion E1 of the element base 1. More specifically, as illustrated in FIG. 2, the intermediate leading-end protective layer 3 has contact with the inner leading-end protective layers 180 at least on the two main surfaces facing each other of the element base 1, and has contact with the ceramic body 101 at least on the leading end surface 101e.

In the description hereinafter, a part of the intermediate leading-end protective layer 3 along the side surface of the element base 1 is referred to as a first part 3a and a part thereof along the leading end surface 101e is referred to as a second part 3b. In particular, a part of the first part 3a along the pump surface is also referred to as a pump surface-side part 3a1, and a part along the heater surface is also referred to as a heater surface-side part 3a2. The first part 3a and the second part 3b, however, are not independent of each other, and are contiguous to each other. In other words, the intermediate leading-end protective layer 3 has a bottomed shape as a whole.

In the meanwhile, the outer leading-end protective layer 2 surrounds the intermediate leading-end protective layer 3 to have contact with the whole outer surface of the intermediate leading-end protective layer 3, and has contact with the inner leading-end protective layers 180 at a part closer to a back end side than a range of formation of the intermediate leading-end protective layer 3 in a longitudinal direction of the element. Thus, the outer leading-end protective layer 2 also has a bottomed shape as a whole.

In the description hereinafter, a portion of the outer leading-end protective layer 2 having contact with the element base 1 is referred to as a base-fixed portion 201, a portion surrounding the side surface of the element base 1 and having contact with the first part 3a of the intermediate leading-end protective layer 3 is referred to as a side surface portion 202, and a portion having contact with the second part 3b of the intermediate leading-end protective layer 3 is referred to as an end surface portion 203.

That is to say, the outer leading-end protective layer 2 has largely contact with the intermediate leading-end protective layer 3, and is fixed to the element base 1 only in the base-fixed portion 201 having a band shape sequentially along the side surfaces of the element base 1.

The outer leading-end protective layer 2 and the intermediate leading-end protective layer 3 are the porous layers, thus gas flows in and out between the element base 1 (the ceramic body 101) and the outside at all times. That is to say, introduction of the measurement gas into the element base 1 (ceramic body 101) through the gas inlet 105 is naturally performed without any problems.

The outer leading-end protective layer 2 is provided to surround a portion of the element base 1 in which the temperature becomes high when the gas sensor 100 is in use to thereby obtain water resistance property in the portion. The outer leading-end protective layer 2 suppresses the occurrence of cracking (water-induced cracking) of the element base 1 due to thermal shock caused by local temperature reduction upon direct exposure of the portion to water. The reason why the intermediate leading-end protective layer 3 is interposed between the outer leading-end protective layer 2 and the element base 1 is that, even if the outer leading-end protective layer 2 is exposed to water to cause the local temperature reduction, the interposed space having a large heat capacity suitably suppresses the occurrence of the water-induced cracking caused by the action of the thermal shock on the element base 1.

The intermediate leading-end protective layer 3 is provided to have a porosity of 25% to 80%, and has a thickness of 100 μm to 700 μm. In the meanwhile, the outer leading-end protective layer 2 is provided to have a porosity of 15% to 30%, and has a thickness of 100 μm to 400 μm. The intermediate leading-end protective layer 3 and the outer leading-end protective layer 2 need not have the same thickness. The thickness of the outer leading-end protective layer 2 hereinafter refers to the thickness of the side surface portion 202 and the end surface portion 203.

The side surface portion 202 and the end surface portion 203, however, may not have the same thickness. On the other hand, the thickness of the base-fixed portion 201 may have a greater value than that of the thickness of the side surface portion 202 as long as the base-fixed portion 201 does not protrude farther from the side surface portion 202 in an element thickness direction and an element width direction of the sensor element 10.

The thickness of only the inner leading-end protective layer 180 has a smaller value than those of both the outer leading-end protective layer 2 and the intermediate leading-end protective layer 3.

These mean that the intermediate leading-end protective layer 3 which is the porous layer having a relatively large porosity and thickness and thus having a large heat capacity and excellent in heat insulating properties is interposed between the outer leading-end protective layer 2 and the element base 1. The provision of the intermediate leading-end protective layer 3 has an effect that even if the outer leading-end protective layer 2 is exposed to water to cause the local temperature reduction, preferably suppressed is the occurrence of the water-induced cracking caused by the action of the thermal shock on the element base 1.

As an additional remark, the inner leading-end protective layer 180 adjacent to the intermediate leading-end protective layer 3 is also formed to have a relatively large porosity of 30% to 65% as described above, although having a small thickness, and thus has a larger heat capacity than the outer leading-end protective layer 2 and the main surface protective layers 170, although it is smaller than heat capacity of the intermediate leading-end protective layer 3. The presence of the inner leading-end protective layers 180 contributes to suppression of the water-induced cracking as with the intermediate leading-end protective layer 3.

The intermediate leading-end protective layer 3 and the inner leading-end protective layer 180 have a relatively large porosity of substantially the same degree, thus it is also considered that one layer made up of these protective layers may be apparently formed by a method of forming one of these protective layers.

In case of forming such a layer, the thickness thereof is desired to be large enough to exceed at least approximately 100 μm from a viewpoint of securing the heat capacity. However, it is not easy to form such a thick film by an application method adopted in a formation of the inner leading-end protective layer 180 described below even if the application is performed repeatedly.

In the meanwhile, in a case of a thermal spraying method adopted in forming the intermediate leading-end protective layer 3 and further the outer leading-end protective layer 2, the thick film is formed relatively easily, however, the thermal spraying method is slightly less efficient than the application method in some cases in terms of adhesion (adhesion to a layer having a relatively small porosity) of a thick film layer (a total thickness of the two layers is larger than 200 μm at a minimum) to be formed.

In the sensor element 10 according to the present embodiment, in consideration of these points, the inner leading-end protective layer 180 having the large porosity is provided to have the thickness of 20 μm to 50 μm by the application method on at least two main surface facing each other of the element base 1 in the process of forming the element base 1, and the intermediate leading-end protective layer 3 having the large thickness of 100 μm to 700 μm is then provided on an outermost periphery of the obtained element base 1 by the thermal spraying method, thus the adhesion of the intermediate leading-end protective layer 3 to the element base 1 is secured while an advantage of the thermal spraying method, that is, easiness in forming the thick film is achieved.

In addition, a difference of the porosity between the outer leading-end protective layer 2 and the inner leading-end protective layer 180 is equal to or larger than 10% and equal to or smaller than 50%. Accordingly, a so-called anchoring effect preferably acts between the base-fixed portion 201 of the outer leading-end protective layer 2 and the inner leading-end protective layers 180. The anchoring effect has an effect of suppressing delamination of the outer leading-end protective layer 2 from the element base 1 caused by a difference in coefficient of thermal expansion between the outer leading-end protective layer 2 and the element base 1 even though the adhesion between the outer leading-end protective layer 2 and the intermediate leading-end protective layer 3 is sufficient when the sensor element 10 is in use.

That is to say, the sensor element 10 according to the present embodiment has the configuration that the intermediate leading-end protective layer 3 excellent in heat insulating properties is interposed between the outer leading-end protective layer 2 and the element base 1 and the outer leading-end protective layer 2 is directly fixed to the element base 1, and this configuration is effective in achieving both the suppression of the water-induced cracking and securing of the adhesion of the outer leading-end protective layer 2.

The main surface protective layers 170 are made of alumina as with the inner leading-end protective layers 180, but have a smaller porosity and a smaller thickness than the inner leading-end protective layers 180, and thus, even if the inner leading-end protective layers 180 are omitted to provide the outer leading-end protective layer 2 directly on the main surface protective layers 170, such an effect of mitigating the difference in thermal expansion as is obtained with the inner leading-end protective layers 180 cannot highly be expected.

A porosity of the outer leading-end protective layer 2 of less than 15% is not preferable as a risk of clogging with poisoned substances increases, and responsiveness of the sensor element 10 is degraded.

On the other hand, a porosity of the outer leading-end protective layer 2 more than 30% is not preferable as the strength of the outer leading-end protective layer 2 is not secured.

A porosity of the intermediate leading-end protective layer 3 of less than 25% is not preferable as a heat insulating effect cannot be preferably obtained and thus, water resistance property is reduced.

A porosity of the inner leading-end protective layer 180 of more than 65% is not preferable as adhesion to the ceramic body 101 cannot be sufficiently obtained.

A portion in which the base-fixed portion 201 of the outer leading-end protective layer 2 and the element base 1 (inner leading-end protective layers 180) are in contact with each other in area (a fixed area ratio) is preferably equal to or larger than 10% and equal to or smaller than 50% of a total range in which the outer leading-end protective layer 2 surrounds the element base 1. In this case, more stable fixing of the outer leading-end protective layer 2 to the element base 1 and securing of water resistance property are achieved. When the fixed area ratio is larger than 50%, a range of formation of the intermediate leading-end protective layer 3 is reduced, thus such a configuration is not preferable as the effect of securing the water resistance property caused by the intermediate leading-end protective layer 3 cannot be sufficiently obtained.

A sum of a thickness of a part of the outer leading-end protective layer 2 other than the base-fixed portion 201 and the thickness of the intermediate leading-end protective layer 3 is preferably larger than the thickness of the base-fixed portion 201 of the outer leading-end protective layer 2. Accordingly, water resistance property can be secured more reliably, and power consumption is suppressed when the heater 150 performs heating.

Figure 3:
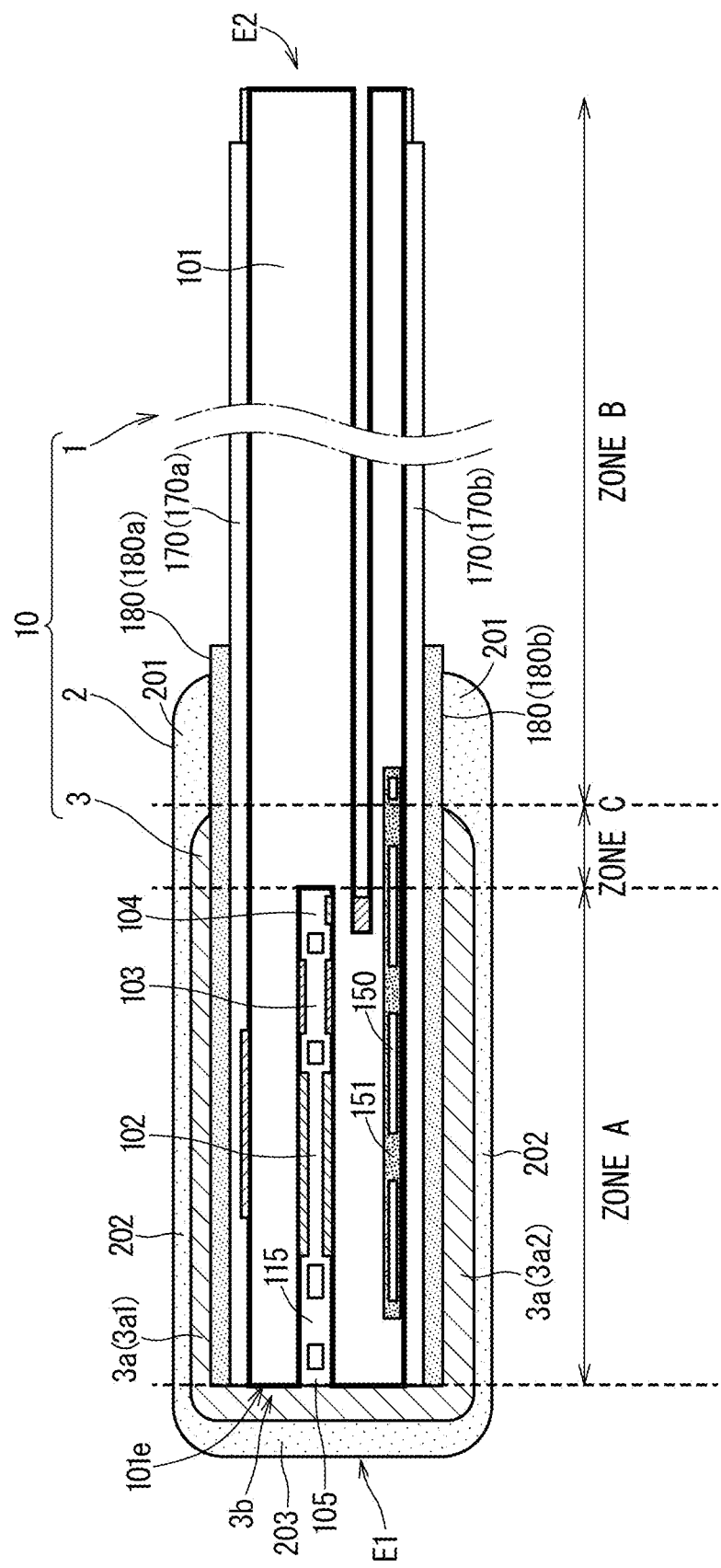
FIG. 3 is a diagram for more particularly describing specific placement locations of an outer leading-end protective layer 2 and an intermediate leading-end protective layer 3, and the significance thereof.

FIG. 3 is a diagram for more particularly describing specific placement locations of the outer leading-end protective layer 2 and the intermediate leading-end protective layer 3, and the significance thereof. As illustrated in FIG. 3, in the element base 1, three zones, that is, zones A, B, and C are conceptually defined in a longitudinal direction of the element. Placement of the outer leading-end protective layer 2 and the intermediate leading-end protective layer 3 is determined based on these zones.

The zone A is a region heated by the heater 150 to a temperature of 500° C. or more when the gas sensor 100 is in use. As described above, when the gas sensor 100 is in use, the sensor element 10 is heated by the heater 150 so that the temperature at least in the range from the first internal chamber 102 to the second internal chamber 103 becomes 500° C. or more. The range thus belongs to the zone A at any time. FIG. 3 illustrates a case where the zone A substantially coincides with a portion including the gas distribution part from the gas inlet 105 to the third internal chamber 104 in the longitudinal direction of the element base 1.

In contrast, the zone B is a region starting at an end portion of the fixed portion 201 on the side of the one end portion E1 (a position farthest from the one end portion E1 of the intermediate leading-end protective layer 3), and ending at the other end portion E2 of the element base 1. The zone B is maintained at 500° C. or less when the gas sensor 100 is in use during which the sensor element 10 is heated by the heater 150. There is no intermediate leading-end protective layer 3 in the zone B. More specifically, in the zone B, the temperature decreases with increasing distance from the one end portion E1 of the element base 1, and a region in which the temperature becomes 500° C. is limited to the vicinity of the boundary with the zone C or A.

The zone C is the region between the zones A and B in the longitudinal direction of the element base 1. The zone C, however, is not necessarily required, and the zones A and B may be adjacent to each other.

In the sensor element 10 of the gas sensor 100 according to the present embodiment, since the base-fixed portion 201 in which the outer leading-end protective layer 2 is fixed to the inner leading-end protective layers 180 is included in the zone B, the intermediate leading-end protective layer 3 (the first part 3a and the second part 3b) is inevitably present at least around a portion of the element base 1 belonging to the zone A, including the leading end portion.

In other words, a portion of the element base 1 heated to a high temperature of 500° C. or more when the gas sensor 100 is in use is not in contact with the outer leading-end protective layer 2, and the intermediate leading-end protective layer 3 is surely provided around the portion. When the gas sensor 100 is in use, the side surface portion 202 and the end surface portion 203 of the outer leading-end protective layer 2 are also heated to a high temperature of 500° C. or more.

In practical use of the gas sensor 100 including the sensor element 10 in which the outer leading-end protective layer 2 and the intermediate leading-end protective layer 3 are provided in a manner as described above, the sensor element 10 is heated by the heater 150 so that a temperature profile in which the temperature is 500° C. or more in the zone A while the temperature is 500° C. or less in the zone B is achieved.

In this heating situation, once water vapor included in the measurement gas adheres, as water droplets, to the side surface portion 202 or the end surface portion 203 of the outer leading-end protective layer 2 belonging to the zone A, that is, the portion of the sensor element 10 heated to a high temperature of 500° C. or more is exposed to water, local and abrupt temperature reduction occurs in the adherence portion (water-exposed portion). The side surface portion 202 and the end surface portion 203 of the outer leading-end protective layer 2, however, are not in contact with the element base 1, and the intermediate leading-end protective layer 3 (the first part 3a and the second part 3b) having a large heat capacity is interposed between them, and thus thermal shock caused by the temperature reduction in the water-exposed portion does not occur in the element base 1. This means that the occurrence of the water-induced cracking of the sensor element 10 is suitably prevented by using the configuration in which the porous outer leading-end protective layer 2 is provided in the portion in which the temperature becomes 500° C. or more when the gas sensor 100 is in use, and the intermediate leading-end protective layer 3 is interposed between the outer leading-end protective layer 2 and the element base 1 as in the gas sensor 100 according to the present embodiment.

It is confirmed in advance that, even if water droplets adhere to a portion in which the temperature is 500° C. or less, abrupt temperature reduction hardly occurs, and thus thermal shock that can cause the water-induced cracking hardly occurs.

Figure 4:
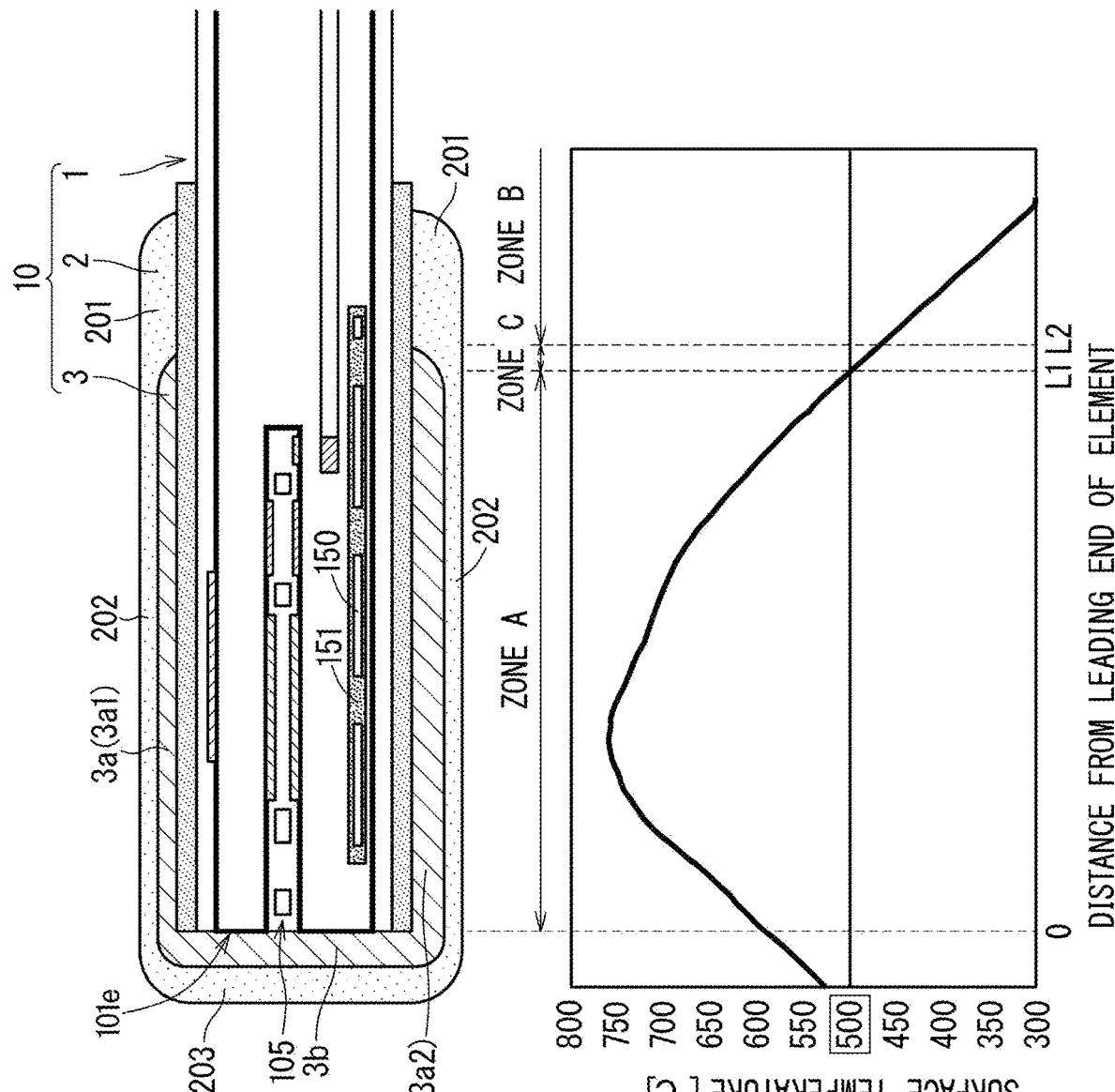
FIG. 4 is a diagram exemplifying a relationship between a temperature profile in a sensor element 10 and a configuration of the sensor element 10 when the sensor element 10 is heated by the heater 150 in accordance with a predetermined control condition when the sensor element 10 is in use.

FIG. 4 illustrates an example of the relationship between a configuration of the sensor element 10 and a temperature profile of the sensor element 10 when the sensor element 10 is heated by the heater 150 in accordance with a predetermined control condition when the sensor element 10 is in use. The temperature profile shown in FIG. 4 is obtained by measuring the surface temperature on the pump surface of the sensor element 10 along the longitudinal direction of the element, and plotting it with the location of the leading end surface 101e on the one end portion E1 as the origin. Thermography is used to measure the surface temperature.

In the example illustrated in FIG. 4, a range extending from the leading end of the element (one end portion E1) by a distance L1 is the zone A, and a range separated from the leading end of the element base 1 by a distance L2 or more is the zone B.

If the control condition of the heater 150 is changed, the temperature profile of the sensor element 10 changes. The properties of the sensor element 10, however, depend on the heating state, and thus the heater 150 typically performs heating so that the same temperature profile is obtained at all times, based on one control condition fixedly set in advance at the time of manufacture (typically, further, to exert the properties of the element as much as possible). The sensor element 10 is thus heated so that the steady temperature profile is obtained. Accordingly, the portion of the element base 1 heated to a temperature of 500° C. or more is the same at all times, and the ranges of the zones A, B, and C may be considered to be fixed in each sensor element 10.

Thus, having only to specify the zones and provide the intermediate leading-end protective layer 3 and the outer leading-end protective layer 2 in accordance with the ranges of the zones at the manufacture of the sensor element 10, the intermediate leading-end protective layer 3 comes to exist around the region (i.e., the zone A) every time heated by the heater 150 to a temperature of 500° C. or more during use after the manufacture.

Furthermore, as for numerous sensor elements 10 manufactured under the same condition, such as sensor elements 10 industrially produced in large quantities, when the sensor elements 10 are heated by the heaters 150 under the same control condition, the temperature profiles obtained from the sensor elements 10 are approximately the same as long as they are manufactured properly. Thus, having only to specify the temperature profile for a sensor element 10 extracted as a sample, and to demarcate the ranges of the zones A, B, and C based on the temperature profile, a condition for forming the outer leading-end protective layer 2 can be determined, based on the results, for all sensor elements 10 manufactured under the same condition without actually specifying the temperature profiles for all the sensor elements 10. That is to say, it is not necessary to actually obtain the temperature profiles for all the sensor elements 10, and demarcate the ranges of the zones A, B, and C based on the results.

In other words, it can be said that, for the sensor elements 10 manufactured under the same condition as described above, a region (a region to be coped with water-induced cracking) of the element base 1 is specified in advance in accordance with setting of the control condition of the heater 150, which is a region where the water-induced cracking may occur upon receipt of thermal shock caused by adherence of water droplets during use, and thus any coping with the water-induced cracking is needed. In the case of FIGS. 3 and 4, the zone A corresponds to the region. It can be said that the outer leading-end protective layer 2 surrounds a predetermined range of the element base 1 on the one end portion E1 so that the intermediate leading-end protective layer 3 is interposed between the region to be coped with water-induced cracking and the outer leading-end protective layer 2. It can also be said that, in this case, the outer leading-end protective layer 2 is fixed to the element base 1 in a region specified in advance as a region (water-induced cracking not occurring region) where the water-induced cracking does not occur during use. In the case of FIGS. 3 and 4, the zone B corresponds to the region.

As described above, according to the present embodiment, the intermediate leading-end protective layer having the large heat capacity is provided at least around the region to be coped with water-induced cracking specified in advance and including the range from the first internal chamber to the second internal chamber of the element base of the sensor element included in the gas sensor, and the outer leading-end protective layer is provided to surround the intermediate leading-end protective layer. The sensor element having more superior water resistance property than that of a conventional sensor element can thereby be achieved. Furthermore, the inner leading-end protective layers having a larger porosity than the outer leading-end protective layer are provided on at least two main surfaces facing each other in the outer periphery of the element base, and the outer leading-end protective layer is fixed to the inner leading-end protective layers in the water-induced cracking not-occurring region specified in advance. Delamination and, further, detachment of the outer leading-end protective layer can thereby suitably be suppressed.

<Process of Manufacturing Sensor Element>

Figure 5:
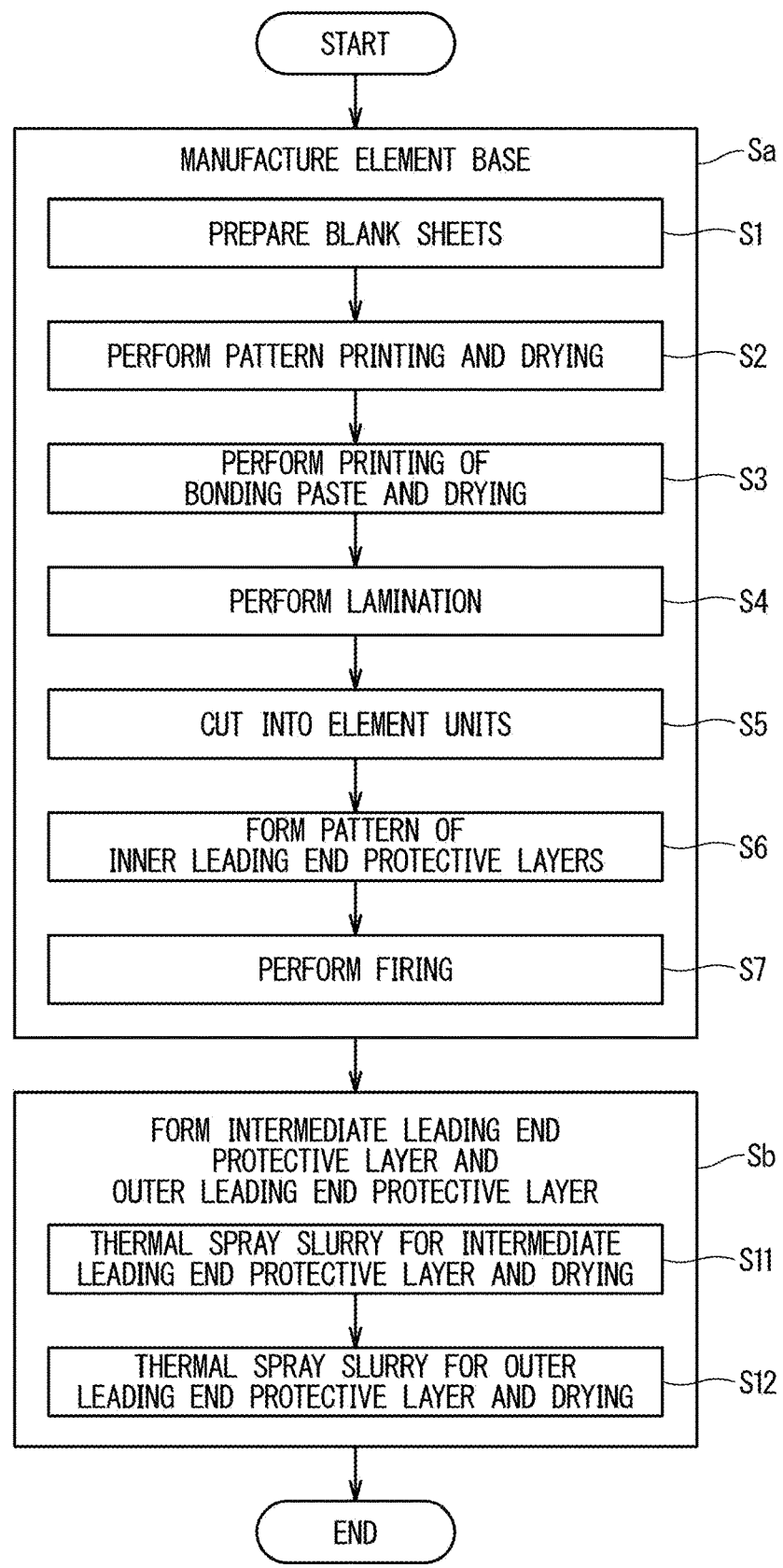
FIG. 5 is a diagram illustrating a flow of processing at a manufacture of the sensor element 10.

One example of a process of manufacturing the sensor element 10 having a configuration and features as described above will be described next. FIG. 5 is a flowchart of processing at the manufacture of the sensor element 10. As shown in FIG. 5, in the present embodiment, procedures for manufacturing the sensor element 10 are roughly as follows: the element base 1 including the ceramic body 101 as a laminated body of a plurality of solid electrolyte layers is manufactured using a known green sheet process (Step Sa), and then the outer leading-end protective layer 2 and the intermediate leading-end protective layer 3 are fixed to the element base 1 (Step Sb). Accordingly, the ranges of the zones A, B, and C are supposed to be already known.

At the manufacture of the element base 1, a plurality of blank sheets (not illustrated) being green sheets containing the oxygen-ion conductive solid electrolyte, such as zirconia, as a ceramic component and having no pattern formed thereon are prepared first (Step S1).

The blank sheets have a plurality of sheet holes used for positioning in printing and lamination. The sheet holes are formed to the blank sheets in advance prior to pattern formation through, for example, punching by a punching machine when the sheets are in the form of the blank sheets. Green sheets corresponding to a portion of the ceramic body 101 in which an internal space is formed also include penetrating portions corresponding to the internal space formed in advance through, for example, punching as described above. The blank sheets are not required to have the same thickness, and may have different thicknesses in accordance with corresponding portions of the element base 1 eventually formed.

After preparation of the blank sheets corresponding to the respective layers, pattern printing and drying are performed on the individual blank sheets (Step S2). Specifically, a pattern of various electrodes, a pattern of the heater 150 and the insulating layer 151, a pattern of the electrode terminals 160, a pattern of the main surface protective layers 170, a pattern of internal wiring, which is not illustrated, and the like are formed. Application or placement of a sublimable material for forming the first diffusion control part 110, the second diffusion control part 120, the third diffusion control part 130, and the fourth diffusion control part 140 is also performed at the time of pattern printing.

The patterns are printed by applying pastes for pattern formation prepared in accordance with the properties required for respective formation targets onto the blank sheets using known screen printing technology. A known drying means can be used for drying after printing.

After pattern printing on each of the blank sheets, printing and drying of a bonding paste are performed to laminate and bond the green sheets (Step S3). The known screen printing technology can be used for printing of the bonding paste, and the known drying means can be used for drying after printing.

The green sheets to which an adhesive has been applied are then stacked in a predetermined order, and the stacked green sheets are crimped under predetermined temperature and pressure conditions to thereby form a laminated body (Step S4). Specifically, crimping is performed by stacking and holding the green sheets as a target of lamination on a predetermined lamination jig, which is not illustrated, while positioning the green sheets at the sheet holes, and then heating and pressurizing the green sheets together with the lamination jig using a lamination machine, such as a known hydraulic pressing machine. The pressure, temperature, and time for heating and pressurizing depend on a lamination machine to be used, and these conditions may be determined appropriately to achieve good lamination.

After the laminated body is obtained as described above, the laminated body is cut out at a plurality of locations to obtain unit bodies (referred to as element bodies) eventually becoming the individual element bases 1 (Step S5).

Formation (application and drying) of a pattern that becomes the inner leading-end protective layers 180 on the element base 1 at completion is then performed on each of the cut out element bodies (Step S6). Formation of the pattern is performed using a paste prepared in advance so that the inner leading-end protective layers 180 as desired are eventually formed.

Each of the element bodies on which the pattern that becomes the inner leading-end protective layers 180 has been formed is then fired at a firing temperature of approximately 1300° C. to 1500° C. (Step S7). The element base 1 is thereby manufactured. That is to say, the element base 1 is generated by integrally firing the ceramic body 101 made of the solid electrolyte, the electrodes, the main surface protective layers 170, and the inner leading-end protective layers 180. Integral firing is performed in this manner, so that the electrodes each have sufficient adhesion strength in the element base 1.

After the element base 1 is manufactured in the above-mentioned manner, formation of the outer leading-end protective layer 2 the intermediate leading-end protective layer 3 is then performed on the element base 1.

Firstly, slurry containing a material for forming the intermediate leading-end protective layer 3 is thermal sprayed onto the element base 1 at a formation target location of the intermediate leading-end protective layer 3, and then dried (step S11). Accordingly, an organic component volatilizes from a thermal sprayed film, and the intermediate leading-end protective layer 3 is formed.

Subsequently, slurry containing a material for forming the outer leading-end protective layer 2 is thermal sprayed onto the element base 1 at a formation target location of the outer leading-end protective layer 2, and then dried (step S12). Accordingly, an organic component volatilizes from a thermal sprayed film, and the outer leading-end protective layer 2 is formed.

Slurry used in each thermal spraying is made of alumina powder, binder, and solvent, for example, and is prepared in advance in accordance with the porosity achieved in each layer.

The sensor element 10 is thereby obtained. The sensor element 10 thus obtained is housed in a predetermined housing, and built into the body, which is not illustrated, of the gas sensor 100.

Second Embodiment

The configuration of the sensor element for securing water resistance property by interposing the intermediate leading-end protective layer between the outer leading-end protective layer and the element base while suppressing delamination and detachment of the outer leading-end protective layer is not limited to that shown in the first embodiment. In the present embodiment, a configuration of a sensor element 20 heated in accordance with a temperature profile shifted to a lower temperature side compared with the sensor element 10 according to the first embodiment is described.

Figure 6:
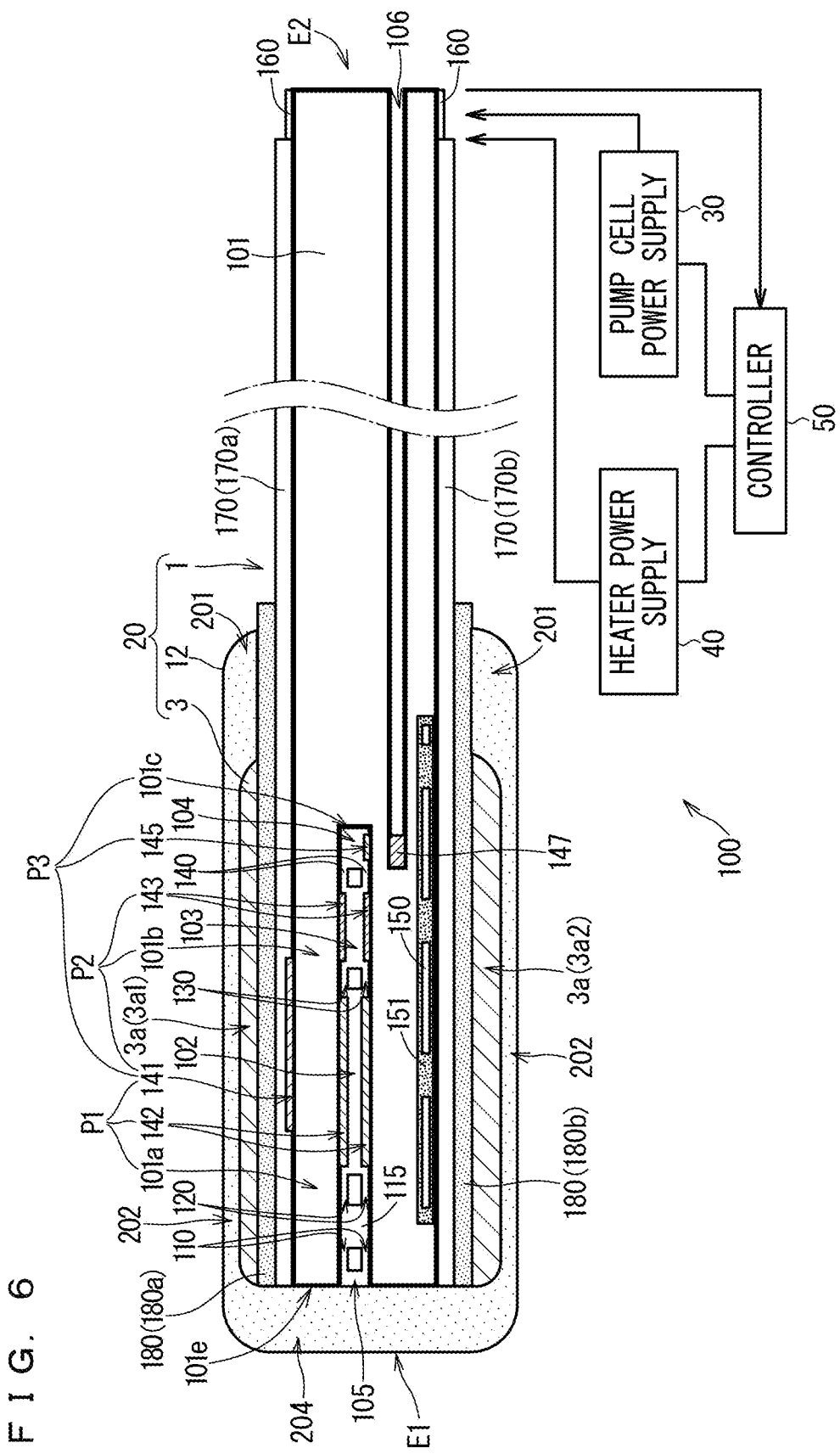
FIG. 6 is a sectional view taken along the longitudinal direction of the sensor element 20 according to a second embodiment.

FIG. 6 is a sectional view taken along the longitudinal direction of the sensor element 20 according to a second embodiment of the present invention. The sensor element 20 has components similar to those of the sensor element 10 according to the first embodiment except for some components. The similar components thus bear the same reference signs as those in the first embodiment, and detailed description thereof is omitted below.

As with the sensor element 10 according to the first embodiment, the sensor element 20 is used as a main component of the gas sensor 100, under operation control of the pump cells and the heater 150 performed through control of the pump cell power supply 30 and the heater power supply 40 performed by the controller 50. Thus, in a case where the target of measurement of the gas sensor 100 is NOx in the measurement gas, operation of the pump cells and the heater 150 of the sensor element 20 is controlled through control of the pump cell power supply 30 and the heater power supply 40 performed by the controller 50, and the NOx concentration in the measurement gas is calculated by the controller 50 based on the linear relationship between the current value (NOx signal) of the pump current $1p2$ flowing through the measurement pump cell P3 under the control and the concentration of decomposed NOx.

As illustrated in FIG. 6, the sensor element 20 includes, in place of the outer leading-end protective layer 2 of the sensor element 10, an outer leading-end protective layer (first leading-end protective layer) 12 fixed to the element base 1 in a different manner from the outer leading-end protective layer 2. Specifically, the outer leading-end protective layer 12 of the sensor element 20 is similar to the outer leading-end protective layer 2 of the sensor element 10 in that the intermediate leading-end protective layer 3 is interposed between the outer leading-end protective layer and the side surfaces of the element base 1. The outer leading-end protective layer 12, however, is different from the outer leading-end protective layer 2 in that an end surface portion 204 is fixed to the leading end surface $101e$ of the element base 1 on the one end portion E1 of the element base 1, as the end surface portion 203 of the outer leading-end protective layer 2 is separated from the element base. The intermediate leading-end protective layer 3 existing in the sensor element 20 is thus only the first part $3a$ interposed between the outer leading-end protective layer 12 and the side surfaces of the element base 1, and the second part $3b$ interposed in the sensor element 10 is not present. Since the outer leading-end protective layer 12 and the intermediate leading-end protective layer 3 are porous layers, introduction of the measurement gas into the element base 1 (ceramic body 101) through the gas inlet 105 is performed without any problems.

That is to say, the outer leading-end protective layer 12 included in the sensor element 20 according to the present embodiment has contact with the intermediate leading-end protective layer 3 in the side surface portion 202, and is fixed to the element base 1 in the base-fixed portion 201 having a band shape sequentially along the side surfaces of the element base 1 and the end surface portion 204.

Also in the outer leading-end protective layer 12, a portion in which the base-fixed portion 201 and the element base 1 (inner leading-end protective layers 180) are in contact with each other in area (a fixed area ratio) is preferably equal to or larger than 10% and smaller than 50% of a total range in which the outer leading-end protective layer 12 surrounds the element base 1, as with the outer leading-end protective layer 2 of the sensor element 10.

The sensor element 20 having a configuration as described above can be manufactured in a similar manner to the sensor element 10 according to the first embodiment as described based on FIG. 5 except that the manner of formation of the thermal sprayed films of them is different due to the difference in shape of the intermediate leading-end protective layer 3 and the outer leading-end protective layer 12 eventually formed.

Figure 7:
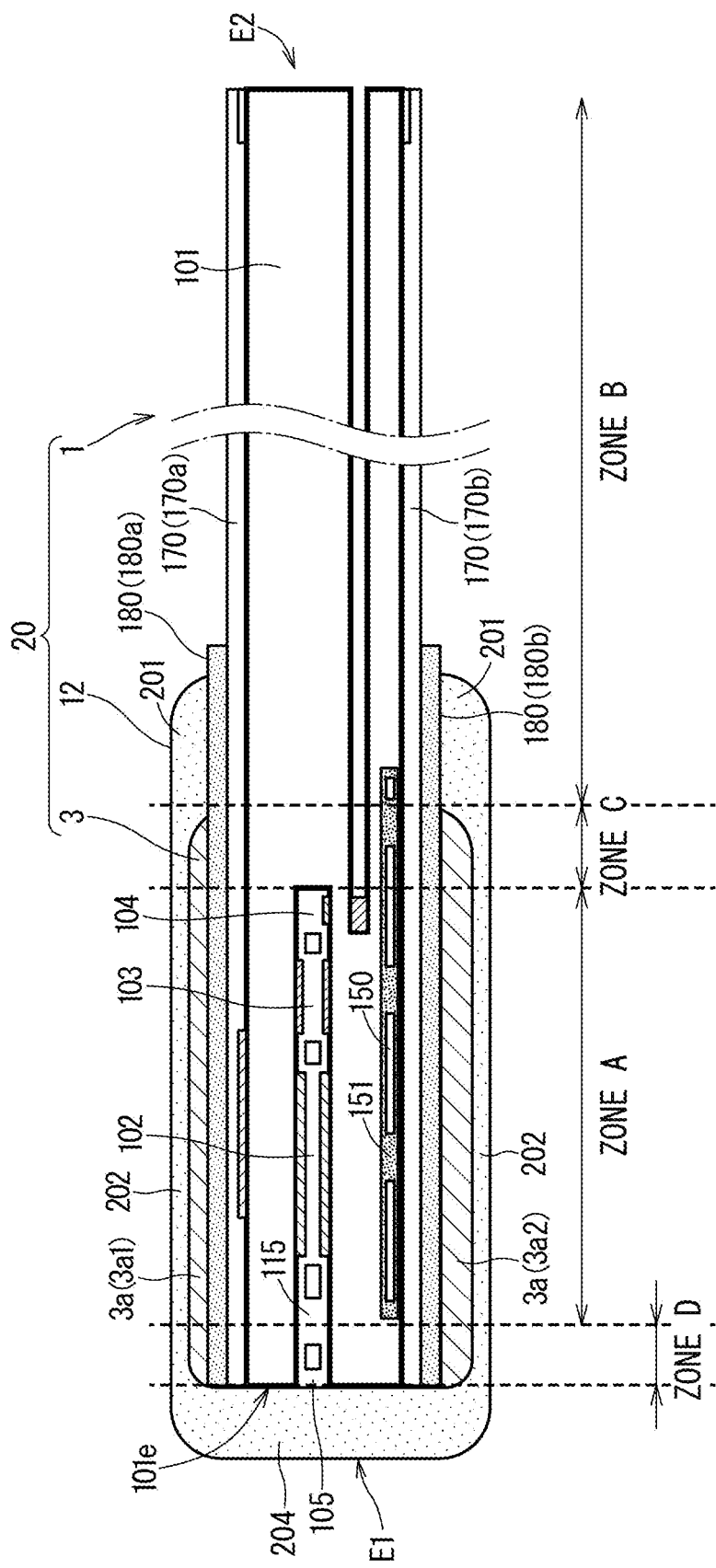
FIG. 7 is a diagram for more particularly describing specific placement locations of an outer leading-end protective layer 12 and an intermediate leading-end protective layer 3, and the significance thereof.

The difference between the sensor element 10 and the sensor element 20 in presence or absence of the interposed second part 3b corresponds to the difference between them in temperature profile when the gas sensor 100 is in use. As described above, the sensor element 20 according to the present embodiment is assumed to be used in accordance with the temperature profile shifted to the lower temperature side compared with the sensor element 10 according to the first embodiment. Description is made on this point based on FIG. 7. FIG. 7 is a diagram for more particularly describing specific placement locations of the outer leading-end protective layer 12 and the intermediate leading-end protective layer 3, and the significance thereof, similarly to FIG. 3.

Placement of the outer leading-end protective layer 12 and the intermediate leading-end protective layer 3 is determined based on zones dividing the element base 1 also in the case of the sensor element 20 as with the sensor element 10. As illustrated in FIG. 7, the sensor element 20 has the zones A, B, and C as with the sensor element 10. Definitions of these zones are the same as those in the sensor element 10. That is to say, the zone A is the region at least including the range from the first internal chamber 102 to the second internal chamber 103, and heated by the heater 150 to a temperature of 500° C. or more when the gas sensor 100 is in use. The zone B is the region starting at the end portion of the base-fixed portion 201 in which the outer leading-end protective layer 12 is fixed to the inner leading-end protective layers 180 on the side of the one end portion E1, and ending at the other end portion E2 of the element base 1, and maintained at 500° C. or less when the gas sensor 100 is in use. The zone C is the region between the zones A and B in the longitudinal direction of the element base 1.

While the zone A reaches the gas inlet 105 in the sensor element 10 illustrated in FIG. 3, a predetermined range extending from the gas inlet 105 is classified as a zone D different from the zone A in the sensor element 20 illustrated in FIG. 7.

The zone D is a region maintained at 500° C. or less when the gas sensor 100 is in use on the one end portion E1 of the sensor element 20. In other words, when the gas sensor 100 including the sensor element 20 is in use, the sensor element 20 is heated by the heater 150 provided inside the sensor element 20 so that the temperature profile in which the zone D is formed in addition to the zones A to C is achieved.

In the sensor element 20, the intermediate leading-end protective layer 3 (first part 3a) is inevitably present at least around the portion of the element base 1 belonging to the zone A as in the sensor element 10. Thus, once the portion belonging to the zone A and heated to a high temperature of 500° C. or more is exposed to water when the gas sensor 100 is in use, local and abrupt temperature reduction occurs in the water-exposed portion, but thermal shock caused by the temperature reduction in the water-exposed portion does not occur in the element base 1. This is because the side surface portion 202 of the outer leading-end protective layer 12 is not in contact with the element base 1 and the intermediate leading-end protective layer 3 (first part 3a) having a large heat capacity is interposed between them.

This is also as in the sensor element 10 that, even if water droplets adhere to the portion in which the temperature is 500° C. or less when the gas sensor 100 is in use, abrupt temperature reduction hardly occurs, and thus thermal shock that may cause the water-induced cracking hardly occurs. In the sensor element 20, such a portion in which the temperature is 500° C. or less during use is present not only in the zone B on the side of the other end portion E2, but also in the zone D on the side of the one end portion E1.

A suitable range of the thickness and the porosity of the outer leading-end protective layer 12 is similar to that of the outer leading-end protective layer 2 of the sensor element 10. A range of the thickness and the porosity of the intermediate leading-end protective layer 3 is also similar to that of the sensor element 10.

Figure 8:
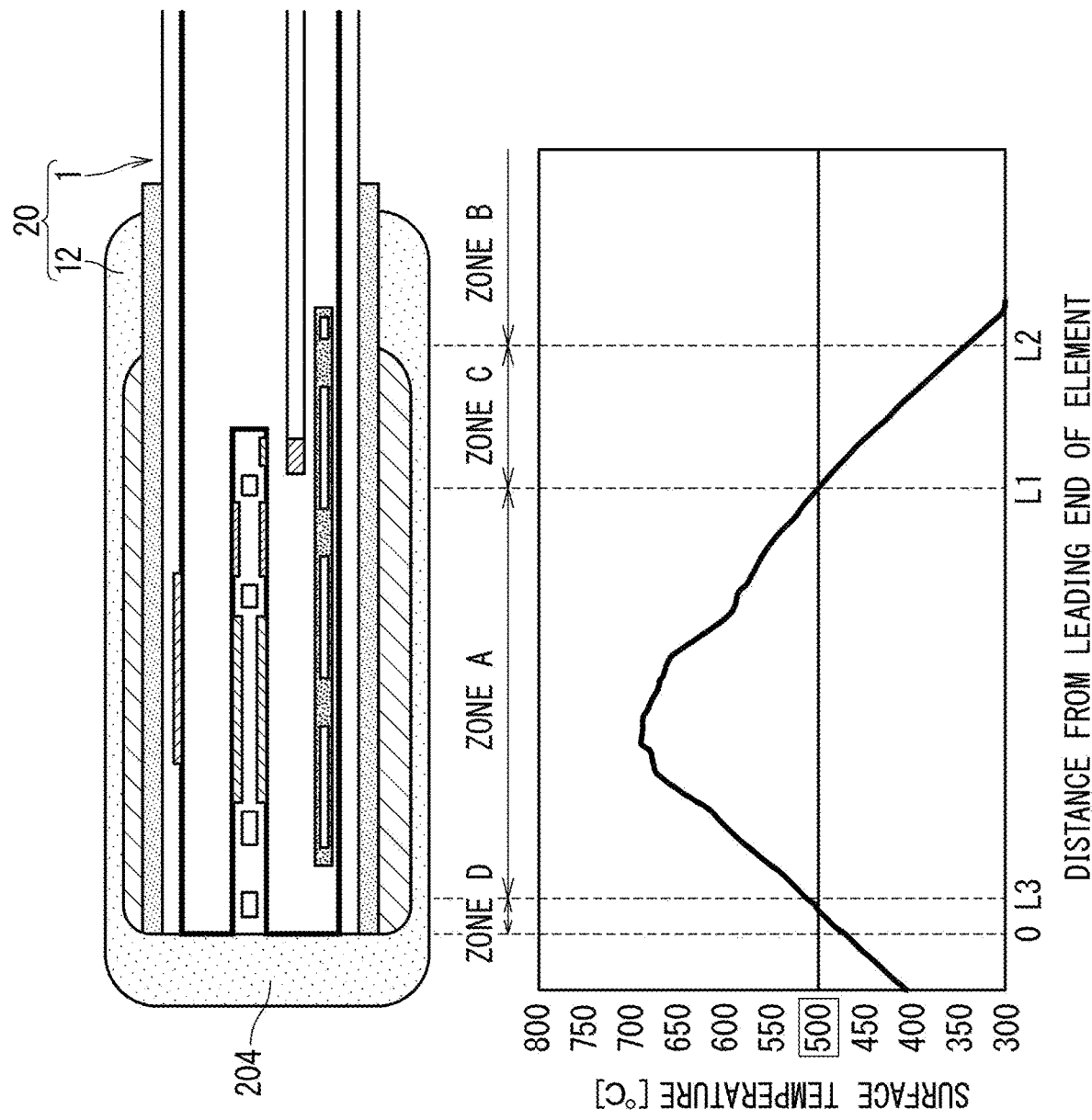
FIG. 8 is a diagram exemplifying a relationship between a temperature profile in a sensor element 20 and a configuration of the sensor element 20 when the sensor element 20 is heated by the heater 150 in accordance with a predetermined control condition when the sensor element 20 is in use.

FIG. 8 illustrates an example of the relationship between a configuration of the sensor element 20 and a temperature profile of the sensor element 20 when the sensor element 20 is heated by the heater 150 in accordance with a predetermined control condition when the sensor element 20 is in use. The temperature profile shown in FIG. 8 is obtained by measuring the surface temperature on the pump surface of the sensor element 20 along the longitudinal direction of the element, and plotting it with the location of the leading end surface 101e on the one end portion E1 as the origin. Thermography is used to measure the surface temperature.

In the example illustrated in FIG. 8, a range extending from the leading end surface 101e by a distance L3 is the zone D, and a range adjacent to the range and extending from the location of the distance L3 to the location of the distance L1 is the zone A, in contrast to the case of FIG. 4. A range separated from the leading end of the element by the distance L2 or more is the zone B.

Having only to specify the zones and provide the intermediate leading-end protective layer 3 and the outer leading-end protective layer 12 in accordance with the ranges of the zones at the manufacture of the sensor element 20, the intermediate leading-end protective layer 3 comes to exist around the region (i.e., the zone A) every time heated by the heater 150 to a temperature of 500° C. or more during use after the manufacture.

As in the sensor element 10, as for numerous sensor elements 20 manufactured under the same condition, such as sensor elements 20 industrially produced in large quantities, having only to specify the temperature profile for a sensor element 20 extracted as a sample, and to demarcate the ranges of the zones A, B, C, and D based on the temperature profile, a condition for forming the outer leading-end protective layer 12 and the intermediate leading-end protective layer 3 can be determined, based on the results, for all sensor elements 20 manufactured under the same condition without actually specifying the temperature profiles for all the sensor elements 20. That is to say, it is not necessary to actually obtain the temperature profiles for all the sensor elements 20, and demarcate the ranges of the zones A, B, C, and D based on the results.

In other words, it can be said that, for the sensor elements 20 manufactured under the same condition as described above, the region to be coped with water-induced cracking of the element base 1 is specified in advance in accordance with setting of the control condition of the heater 150, as in the sensor element 10. In the case of FIGS. 7 and 8, the zone A corresponds to the region. The sensor element 20, however, differs from the sensor element 10 in that such a region exists only in a part of the side surfaces of the element base 1. It can be said that the outer leading-end protective layer 12 surrounds a predetermined range of the element base 1 on the one end portion E1 so that the intermediate leading-end protective layer 3 is interposed between the region to be coped with water-induced cracking and the outer leading-end protective layer 12. In this case, the outer leading-end protective layer 12 is fixed to the element base 1 in the water-induced cracking not-occurring region on the side surfaces of the element base 1 as in the sensor element 10. In the case of FIGS. 7 and 8, the zone B corresponds to the region. The sensor element 20, however, differs from the sensor element 10 in that the outer leading-end protective layer 12 is further fixed to the leading end surface 101e of the element base 1.

Also in a case where the temperature on the one end portion E1 becomes 500° C. or less as in the sensor element 20 of FIG. 8, the intermediate leading-end protective layer 3 and the outer leading-end protective layer 2 may be provided so that the second part 3b is interposed between the outer leading-end protective layer 2 and the element base 1 as in the sensor element 10 according to the first embodiment. This is because the intermediate leading-end protective layer 3 is still present around the zone A.

As described above, also according to the present embodiment, in the manner similar to the first embodiment, the intermediate leading-end protective layer having the large heat capacity is provided at least around the region to be coped with water-induced cracking specified in advance and including the range from the first internal chamber to the second internal chamber of the element base of the sensor element included in the gas sensor, and the outer leading-end protective layer is provided to surround the intermediate leading-end protective layer. The sensor element excellent in water resistance property is thereby achieved.

Modification Example

The above-mentioned embodiments are targeted at a sensor element having three internal chambers, but the sensor element may not necessarily have a three-chamber configuration. That is to say, the configuration in which the inner leading-end protective layers having a large porosity are provided on outermost surfaces of the element base on the end portion at least including the gas distribution part, and, further, the outer leading-end protective layer as the porous layer having a smaller porosity than the inner leading-end protective layers is provided outside the inner leading-end protective layers so that the intermediate leading-end protective layer is interposed between the outer leading-end protective layer and the portion of the element base in which the temperature becomes 500° C. or more during use is applicable to a sensor element having one internal chamber or two internal chambers.

In the above-mentioned embodiments, the region heated to a temperature of 500° C. or more during use is set to the region to be coped with water-induced cracking on the premise of the configuration of the sensor element illustrated in FIG. 2 or 6, but the heating temperature of the region considerable as a target of the region to be coped with water-induced cracking may vary depending on the configuration of the sensor element.

Examples (Test 1)

As the sensor element 10 according to the first embodiment, eight types of sensor elements 10 (Examples 1 to 8) having different combinations of thicknesses (thicknesses of the side surface portion 202 and the end surface portion 203) and porosity of the outer leading-end protective layer 2 and thicknesses (thickness of the first part 3a and second part 3b) and porosity of the intermediate leading-end protective layer 3 were manufactured, and a test of water resistance was conducted on them.

As comparative examples, a sensor element (Comparative example 1) in which the outer leading-end protective layer 2 as a whole adhered to the element base 1 without the intermediate leading-end protective layer 3 being interposed therebetween and a sensor element (Comparative example 2) in which the outer leading-end protective layer 2 and the intermediate leading-end protective layer 3 were not provided to expose the element base 1 were manufactured, and a similar test was conducted on them.

Table 1 lists the thickness of the outer leading-end protective layer 2, the thickness of the intermediate leading-end protective layer 3, the porosity of the outer leading-end protective layer 2, the porosity of the intermediate leading-end protective layer 3, and the results of determination in the water resistance test for each sensor element. The element bases 1 of all the sensor elements were manufactured under the same condition. The sensor elements according to Examples 1 to 8 were each set to have a fixed area ratio of 30%. The inner leading-end protective layers 180 of all the sensor elements have the porosity of 40% and the thickness of 40 μm.

TABLE 1

| Level | Thickness of outer leading-end protective layer [μm] | Thickness of intermediate leading-end protective layer [μm] | Porosity of outer leading-end protective layer [%] | Porosity of intermediate leading-end protective layer | Determination 1 |
|---|---|---|---|---|---|
| Example 1 | 200 | 200 | 20 | 30 | ○ |
| Example 2 | 300 | 200 | 15 | 40 | ◎ |
| Example 3 | 150 | 150 | 25 | 40 | ◎ |
| Example 4 | 200 | 200 | 15 | 25 | ○ |
| Example 5 | 150 | 200 | 30 | 50 | ◎ |
| Example 6 | 200 | 500 | 25 | 65 | ☆ |
| Example 7 | 200 | 350 | 30 | 55 | ☆ |
| Example 8 | 200 | 700 | 25 | 80 | ☆ |
| Comparative example 1 | 300 | — | 20 | — | X |
| Comparative example 2 | — | — | — | — | X |

The water resistance test was conducted by the following procedures. First, the heater 150 was energized to heat the sensor element 10 so that a temperature profile in which a maximum temperature in the zone A was 800° C., and the temperature in the zone B was 500° C. or less was obtained. In the temperature profile, the range from the gas inlet 105 to the third internal chamber 104 in the longitudinal direction of the element belonged to the zone A.

While the heating state was maintained, the pump cells and, further, the sensor cells of the sensor element were operated in ambient atmosphere to perform control so that oxygen concentration in the first internal chamber 102 was maintained at a predetermined constant value to thereby obtain a situation in which a pump current Ip0 in the main pump cell P1 was stabilized.

Under the situation, a predetermined amount of water was dropped onto the side surface portion 202 of the outer leading-end protective layer 2 belonging to the zone A (onto a corresponding portion of the element base 1 in Comparative example 2), and whether a change of the pump current Ip0 before and after dropping exceeded a predetermined threshold was determined. If the change of the pump current Ip0 did not exceed the threshold, the amount of dropped water was increased to repeat the determination. The amount of dropped water when the change of the pump current Ip0 eventually exceeded the threshold was defined as a cracking occurring dropped water amount, and water resistance property or a lack thereof was determined based on the magnitude of a value of the cracking occurring dropped water amount. Determination in this manner was referred to as Determination 1. A maximum value of the amount of dropped water was set to 40 μL.

In this test, the change of the pump current Ip0 was used as a criterion for determining the occurrence of cracking in the element base 1. This utilizes such a causal relationship that, when cracking of the element base 1 occurs due to thermal shock caused by dropping (adherence) of water droplets onto the outer leading-end protective layer 2, oxygen flows into the first internal chamber 102 through a portion of the cracking, and the value of the pump current Ip0 increases.

Specifically, the sensor element was determined to have excellent water resistance property if the cracking occurring dropped water amount was 20 μL or more. The sensor element was determined to have great water resistance property if the cracking occurring dropped water amount was 15 μL or more and less than 20 μL. The sensor element was determined to have water resistance property in a range allowable in practical use if the cracking occurring dropped water amount was 10 μL or more and less than 15 μL. The sensor element was determined to have insufficient water resistance property in terms of practicality if the cracking occurring dropped water amount was less than 10 μL. In Japanese Patent Application Laid-Open No. 2016-48230, a case where cracking does not occur with an amount of dropped water of 3 μL is determined as an example. If the cracking occurring dropped water amount is 10 μL or more, the sensor element is thus determined to have more superior water resistance property than that of a conventional sensor element.

In the sensor element including the outer leading-end protective layer 2, delamination of the outer leading-end protective layer 2 in the base-fixed portion 201 did not occur until cracking of the element base 1 occurred.

In Table 1, as the results of Determination 1, a star is marked for the sensor element in which the cracking occurring dropped water amount is 20 μL or more or cracking does not occur upon dropping of a maximum amount of water, a double circle is marked for the sensor element in which the cracking occurring dropped water amount is 15 μL or more and less than 20 μL, a single circle is marked for the sensor element in which the cracking occurring dropped water amount is 10 μL or more and less than 15 μL, and a cross is marked for the sensor element in which the cracking occurring dropped water amount is less than 10 μL.

According to the results shown in Table 1, the sensor elements in Examples 1 to 5 are each marked with the double circle or the single circle, and the sensor elements in Examples 6 to 8 are each marked with the star, whereas the sensor elements in Comparative examples 1 and 2 are each marked with the cross. The cracking occurring dropped water amounts in Examples 6 to 8 were 30 μL, 20 μL, and 40 μL, respectively. In the meanwhile, it was determined that cracking occurred in the sensor element in Comparative example 1 with an amount of dropped water of 5 μL to 9 μL. It was also determined that cracking occurred in the sensor element in Comparative example 2 with an amount of dropped water of less than 1 μL.

The results shown in Table 1 indicate that the sensor element having more superior water resistance property than the conventional sensor element can be achieved by providing the intermediate leading-end protective layer as the porous layer having a porosity ranging from 25% to 80% and a thickness of 100 μm or more and 700 μm or less at least around the portion of the element base of the sensor element included in the gas sensor heated to a high temperature of 500° C. or more when the gas sensor is in use and the outer leading-end protective layer as the porous layer having a porosity ranging from 15% to 30% and a thickness of 100 μm or more and 400 μm or less outside the intermediate leading-end protective layer as in the first embodiment, for example.

(Test 2)

A test was conducted to determine the influence of difference of porosity between the outer leading-end protective layer 2 and the inner leading-end protective layer 180 on water resistance property and adhesion between the outer leading-end protective layer 2 and the element base 1 and between the intermediate leading-end protective layer 3 and the element base 1. Specifically, the porosity of the outer leading-end protective layer 2 was set in a range of 15% to 30%, the porosity of the intermediate leading-end protective layer 3 was set in a range of 25% to 80%, and the porosity of the inner leading-end protective layer 180 was set in a range of 30% to 65%. Eight types of sensor elements (Examples 9 to 16) having different combinations of values thereof were manufactured, and a test of water resistance property and adhesion of the protective layer was conducted on them. In any sensor element, the porosity of the outer leading-end protective layer 2 and the porosity of the inner leading-end protective layer 180 were set within a range of 10% to 50%.

Used as the sensor elements of Examples 9 to 13 were sensor elements manufactured in the same conditions (the same porosity and thickness) as those of the sensor elements of Examples 1 to 5, respectively. In the sensor element of Example 14, the outer leading-end protective layer 2, the intermediate leading-end protective layer 3, and the inner leading-end protective layer 180 have the thickness of 200 μm, 200 μm, and 50 μm, respectively. In the sensor element of Examples 15 and 16, the outer leading-end protective layer 2, the intermediate leading-end protective layer 3, and the inner leading-end protective layer 180 have the thickness of 200 μm, 700 μm, and 50 μm, respectively.

As comparative examples, a sensor element (Comparative example 3) in which the inner leading-end protective layer 180 was not provided and the two types of sensor elements (Comparative examples 4 and 5) in which two of the outer leading-end protective layer 2, the intermediate leading-end protective layer 3, and the inner leading-end protective layer 180 had the porosity out of the setting range described above were manufactured, and a similar test was conducted on them.

The water resistance test was conducted by procedures similar to those in Test 1 except that conduction state by the heater 150 and locations of water droplets were different.

The conduction by the heater 150 was performed so that a surface temperature (maximum temperature) in a portion in which the intermediate leading-end protective layer 3 was interposed between the outer leading-end protective layer 2 and the inner leading-end protective layer 180 (intermediate leading-end protective layer interposed portion), which belongs to the zone A, was variously different in a range of 700° C. to 800° C., and a surface temperature in a portion in which the intermediate leading-end protective layer 3 was not interposed between the outer leading-end protective layer 2 and the inner leading-end protective layer 180 (intermediate leading-end protective layer non-interposed portion), which belongs to the zone B, was variously different in a range of 350° C. to 500° C. The surface temperature was measured by thermography.

A sensor element made under the same condition as that of Example 9 (Example 1) except that only the conduction state by the heater 150 was different and the surface temperature in the intermediate leading-end protective layer non-interposed portion was 600° C. was also made as a comparative example (Comparative example 6).

Evaluation of adhesion was performed by performing a heating vibration test, and subsequently determining presence or absence of delamination of the outer leading-end protective layer 2 and the intermediate leading-end protective layer 3 by visual observation.

The heating vibration test was performed under the following conditions in a state where each sensor element was attached to an exhaust pipe of a propane burner disposed in a vibration-testing machine.

Gas temperature: 850° C.;
Gas air ratio λ: 1.05;
Vibration condition: sweeping with 50 Hz→100 Hz→150 Hz→250 Hz for thirty minutes;
Acceleration rate: 30 G, 40 G, 50 G;
Test time: 150 hours.

Table 2 shows, for each sensor element, the porosity of each of the outer leading-end protective layer 2, the intermediate leading-end protective layer 3, and the inner leading-end protective layer 180, the difference of porosity between the outer leading-end protective layer 2 and the inner leading-end protective layer 180, the surface temperature of each of the intermediate leading-end protective layer interposed portion and the intermediate leading-end protective layer non-interposed portion, a result of water resistance test determined by the same criterion as that of Test 1 (Determination 1 and Determination 2), and a determination result of adhesion (Determination 3). According to the determination result of the adhesion, the sensor elements in which the delamination was not confirmed are each marked with the single circle, whereas the sensor elements in which the delamination was confirmed are each marked with the cross.

TABLE 2

| Level | Porosity of outer leading-end protective layer [%] | Porosity of intermediate leading-end protective layer [%] | Porosity of inner leading-end protective layer [%] | Difference of porosity between outer leading-end protective layer and inner leading-end protective layer [%] | Surface temperature of intermediate leading-end protective layer interposed portion [° C.] | Surface temperature of intermediate leading-end protective layer non-interposed portion [° C.] | Determination 1 | Determination 2 | Determination 3 |
|---|---|---|---|---|---|---|---|---|---|
| Example 9 | 20 | 30 | 35 | 15 | 850 | 450 | ○ | ○ | ○ |
| Example 10 | 15 | 40 | 50 | 35 | 700 | 350 | ◎ | ◎ | ○ |
| Example 11 | 25 | 40 | 45 | 20 | 750 | 450 | ◎ | ○ | ○ |
| Example 12 | 15 | 25 | 30 | 15 | 700 | 350 | ○ | ◎ | ○ |
| Example 13 | 30 | 50 | 60 | 30 | 850 | 500 | ◎ | ◎ | ○ |
| Example 14 | 15 | 40 | 65 | 50 | 830 | 450 | ◎ | ◎ | ○ |
| Example 15 | 25 | 80 | 40 | 15 | 800 | 350 | ☆ | ◎ | ○ |
| Example 16 | 20 | 55 | 50 | 30 | 850 | 470 | ☆ | ◎ | ○ |
| Comparative example 3 | 25 | 40 | None | — | 750 | 450 | ◎ | X | X |
| Comparative example 4 | 15 | 20 | 20 | 5 | 850 | 450 | ○ | ○ | X |
| Comparative example 5 | 10 | 30 | 70 | 60 | 830 | 450 | ○ | ◎ | X |
| Comparative example 6 | 20 | 30 | 35 | 15 | 900 | 600 | ○ | X | ○ |

Water was dropped at two locations, that is, the surface of the side surface portion 202 corresponding to the intermediate leading-end protective layer interposed portion as with Test 1, and the surface of the base-fixed portion 201 corresponding to the intermediate leading-end protective layer non-interposed portion. Determinations of water resistance property or a lack thereof in each location were referred as Determination 1 and Determination 2.

In Table 2, the sensor elements in Examples 9 to 14 are each marked with the star, the double circle, or the single circle in all Determinations 1 to 3. In these sensor elements, the difference of porosity between the outer leading-end protective layer 2 and the inner leading-end protective layer 180 is within a range of 10% to 50%.

In contrast, the sensor elements in Comparative examples 3 to 6 are each marked with the double circle or the single circle in Determination 1, but marked with the cross in at least one of Determinations 2 and 3.

More specifically, shown is a result that the sensor elements in Comparative example 3 in which the inner leading-end protective layer 180 is not provided and Comparative example 6 in which the surface temperature in the intermediate leading-end protective layer non-interposed portion is 600° C. are each marked with the cross in Determination 2. In comparison between the result and Examples 9 to 16, it is considered necessary to provide the inner leading-end protective layer 180 and further make the base-fixed portion 201 in which the outer leading-end protective layer 2 is directly fixed to the inner leading-end protective layer 180 belong to the zone B maintained at 500° C. or less when the sensor element is in use from a viewpoint of the effect of securing the water resistance property.

Shown is a result that the sensor elements in Comparative example 3 in which the inner leading-end protective layer 180 is not provided and Comparative examples 4 and 5 in which the difference of porosity between the outer leading-end protective layer 2 and the inner leading-end protective layer 180 are 5% and 60%, respectively, are each marked with the cross in Determination 3. Specifically, in these sensor elements, delamination occurs at least between the base-fixed portion 201 of the outer leading-end protective layer 2 and the inner leading-end protective layer 180.

Also in consideration of Examples 9 to 16, it is considered that the results indicate that when the difference of porosity between the outer leading-end protective layer 2 and the inner leading-end protective layer 180 is within a range of 10% to 50%, anchoring effect preferably acts between the base-fixed portion 201 and the inner leading-end protective layers 180, thus the adhesion of the outer leading-end protective layer 2 and the intermediate leading-end protective layer 3 to the element base 1 is secured.

It is considered that a value in a range of 25% to 80% suffices as the porosity of the intermediate leading-end protective layer 3 at that time.

What is claimed is:

1. A sensor element included in a gas sensor detecting a predetermined gas component in a measurement gas, comprising:
    an element base including:
        an elongated planar ceramic body made of an oxygen-ion conductive solid electrolyte, and having a gas inlet at the one end portion thereof;
        at least one internal chamber located inside the ceramic body, and communicating with the gas inlet under predetermined diffusion resistance;
        at least one electrochemical pump cell including an outer pump electrode located at a location other than the at least one internal chamber in the ceramic body, an inner pump electrode located to face the at least one internal chamber, and a solid electrolyte located between the outer pump electrode and the inner pump electrode, the at least one electrochemical pump cell pumping in and out oxygen between the at least one internal chamber and an outside;
        a heater buried in a predetermined range on a side of the one end portion of the ceramic body; and
        an inner leading-end protective layer made up of a porous material having a porosity of 30% or more and 65% or less on at least two main surfaces facing each other on the one end portion;
    an intermediate leading-end protective layer, at least a part of which has contact with the inner leading-end protective layer, made up of a porous material having a porosity of 25% or more and 80% or less, which is equal to or smaller than the porosity of the inner leading-end protective layer; and
    an outer leading-end protective layer surrounding the element base on an outermost periphery on the one end portion of the sensor element, having contact with the intermediate leading-end protective layer and the inner leading-end protective layer on sides of four side surfaces of the element base, having contact with a leading end surface of the element base or the intermediate leading-end protective layer on a side of the leading end surface, and made up of a porous material having a porosity of 15% or more and 30% or less, which is smaller than the porosity of the intermediate leading-end protective layer, wherein
    a difference of porosity between the inner leading-end protective layer and the outer leading-end protective layer is equal to or larger than 10% and equal to or smaller than 50%.

2. The sensor element according to claim 1, wherein
the intermediate leading-end protective layer is provided to have contact with a region to be coped with water-induced cracking, which is specified in advance, in the element base, and
the outer leading-end protective layer has contact with the inner leading-end protective layer in a water-induced cracking not-occurring region, which is specified in advance, in the element base.

3. The sensor element according to claim 2, wherein
the region to be coped with water-induced cracking is a region in the element base heated to a temperature of 500° C. or more when the gas sensor is in use, and
a portion in which the outer leading-end protective layer and the inner leading-end protective layer have contact with each other is disposed in a portion maintained at 500° C. or less when the gas sensor is in use.

4. The sensor element according to claim 3, wherein
the intermediate leading-end protective layer has contact with a part of an outer surface of the inner leading-end protective layer and a leading-end surface of the element base, and
the outer leading-end protective layer has contact with the intermediate leading-end protective layer also in the side of the leading-end surface of the element base.

5. The sensor element according to claim 4, wherein
a portion in which the outer leading-end protective layer and the inner leading-end protective layer are in contact with each other in area is equal to or larger than 10% and equal to or smaller than 50% of a range in which the outer leading-end protective layer surrounds the element base in area.

6. The sensor element according to claim 3, wherein
the intermediate leading-end protective layer has contact with a part of an outer surface of the inner leading-end protective layer, and
the outer leading-end protective layer has contact with the leading-end surface of the element base in the side of the leading-end surface.

7. The sensor element according to claim 6, wherein
a portion in which the outer leading-end protective layer and the inner leading-end protective layer are in contact with each other in area is equal to or larger than 10% and equal to or smaller than 50% of a range in which the outer leading-end protective layer surrounds the element base in area.

8. The sensor element according to claim 3, wherein
a thickness of the inner leading-end protective layer is equal to or larger than 20 μm and equal to or smaller than 50 μm,
a thickness of the intermediate leading-end protective layer is equal to or larger than 100 μm and equal to or smaller than 700 μm, and
a thickness of the outer leading-end protective layer is equal to or larger than 100 μm and equal to or smaller than 400 μm.

9. The sensor element according to claim 3, wherein
a portion in which the outer leading-end protective layer and the inner leading-end protective layer are in contact with each other in area is equal to or larger than 10% and equal to or smaller than 50% of a range in which the outer leading-end protective layer surrounds the element base in area.

10. The sensor element according to claim 2, wherein
the intermediate leading-end protective layer has contact with a part of an outer surface of the inner leading-end protective layer and a leading-end surface of the element base, and
the outer leading-end protective layer has contact with the intermediate leading-end protective layer also in the side of the leading-end surface of the element base.

11. The sensor element according to claim 10, wherein
a thickness of the inner leading-end protective layer is equal to or larger than 20 μm and equal to or smaller than 50 μm,
a thickness of the intermediate leading-end protective layer is equal to or larger than 100 μm and equal to or smaller than 700 μm, and
a thickness of the outer leading-end protective layer is equal to or larger than 100 μm and equal to or smaller than 400 μm.

12. The sensor element according to claim 10, wherein
a portion in which the outer leading-end protective layer and the inner leading-end protective layer are in contact with each other in area is equal to or larger than 10% and equal to or smaller than 50% of a range in which the outer leading-end protective layer surrounds the element base in area.

13. The sensor element according to claim 2, wherein
the intermediate leading-end protective layer has contact with a part of an outer surface of the inner leading-end protective layer, and
the outer leading-end protective layer has contact with the leading-end surface of the element base in the side of the leading-end surface.

14. The sensor element according to claim 13, wherein
a thickness of the inner leading-end protective layer is equal to or larger than 20 μm and equal to or smaller than 50 μm,
a thickness of the intermediate leading-end protective layer is equal to or larger than 100 μm and equal to or smaller than 700 μm, and
a thickness of the outer leading-end protective layer is equal to or larger than 100 μm and equal to or smaller than 400 μm.

15. The sensor element according to claim 13, wherein
a portion in which the outer leading-end protective layer and the inner leading-end protective layer are in contact with each other in area is equal to or larger than 10% and equal to or smaller than 50% of a range in which the outer leading-end protective layer surrounds the element base in area.

16. The sensor element according to claim 2, wherein
a thickness of the inner leading-end protective layer is equal to or larger than 20 μm and equal to or smaller than 50 μm,
a thickness of the intermediate leading-end protective layer is equal to or larger than 100 μm and equal to or smaller than 700 μm, and
a thickness of the outer leading-end protective layer is equal to or larger than 100 μm and equal to or smaller than 400 μm.

17. The sensor element according to claim 2, wherein
a portion in which the outer leading-end protective layer and the inner leading-end protective layer are in contact with each other in area is equal to or larger than 10% and equal to or smaller than 50% of a range in which the outer leading-end protective layer surrounds the element base in area.

18. The sensor element according to claim 1, wherein
a thickness of the inner leading-end protective layer is equal to or larger than 20 μm and equal to or smaller than 50 μm,
a thickness of the intermediate leading-end protective layer is equal to or larger than 100 μm and equal to or smaller than 700 μm, and
a thickness of the outer leading-end protective layer is equal to or larger than 100 μm and equal to or smaller than 400 μm.

19. The sensor element according to claim 18, wherein
a portion in which the outer leading-end protective layer and the inner leading-end protective layer are in contact with each other in area is equal to or larger than 10% and equal to or smaller than 50% of a range in which the outer leading-end protective layer surrounds the element base in area.

20. The sensor element according to claim 1, wherein
a portion in which the outer leading-end protective layer and the inner leading-end protective layer are in contact with each other in area is equal to or larger than 10% and equal to or smaller than 50% of a range in which the outer leading-end protective layer surrounds the element base in area.

* * * * *